(12) United States Patent
Hashimoto et al.

(10) Patent No.: US 6,999,754 B2
(45) Date of Patent: Feb. 14, 2006

(54) CAR MOUNTED INFORMATION DEVICE

(75) Inventors: Junji Hashimoto, Kobe (JP); Hideshi Nishizawa, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 435 days.

(21) Appl. No.: 10/255,804

(22) Filed: Sep. 25, 2002

(65) Prior Publication Data

US 2003/0060232 A1 Mar. 27, 2003

(30) Foreign Application Priority Data

Sep. 27, 2001 (JP) ............................. 2001-296306

(51) Int. Cl.
*H04Q 7/20* (2006.01)

(52) U.S. Cl. ............................... 455/414.1; 455/456.1; 455/466.6; 455/457; 340/990
(58) Field of Classification Search ............. 455/414.1, 455/412.1, 2, 414.2, 3, 345, 466, 456.1, 466.6, 455/557, 457; 340/990–992, 995.1–995.23, 340/825.52, 10.1, 989

See application file for complete search history.

(56) References Cited

U.S. PATENT DOCUMENTS

| 6,292,747 | B1 | | 9/2001 | Amro et al. |
| 6,754,485 | B1 | * | 6/2004 | Obradovich et al. ...... 455/414.1 |
| 2003/0073406 | A1 | * | 4/2003 | Benjamin et al. ............. 455/41 |
| 2004/0209601 | A1 | * | 10/2004 | Obradovich et al. ...... 455/414.1 |

* cited by examiner

*Primary Examiner*—Edward F. Urban
*Assistant Examiner*—Blane J. Jackson
(74) *Attorney, Agent, or Firm*—Fogg and Associates, LLC; Laura A. Ryan

(57) ABSTRACT

A communication device, particularly, a car-mounted information device, which makes it possible to obtain information of a transmitting source and of a receiving end linked to a navigation function relying upon end-to-end communication by using electronic mail among vehicles. The car-mounted information device comprises a cellular phone terminal connected to an external unit, a car navigation function, a modem function for transmitting and receiving data end to end between the vehicles via the cellular phone terminals, a mail transmitting/receiving function for transmitting and receiving the data using electronic mail, and a car navigation-linking function for processing the information of the electronic mail transmitted and received by linking the information to the car navigation function.

13 Claims, 26 Drawing Sheets

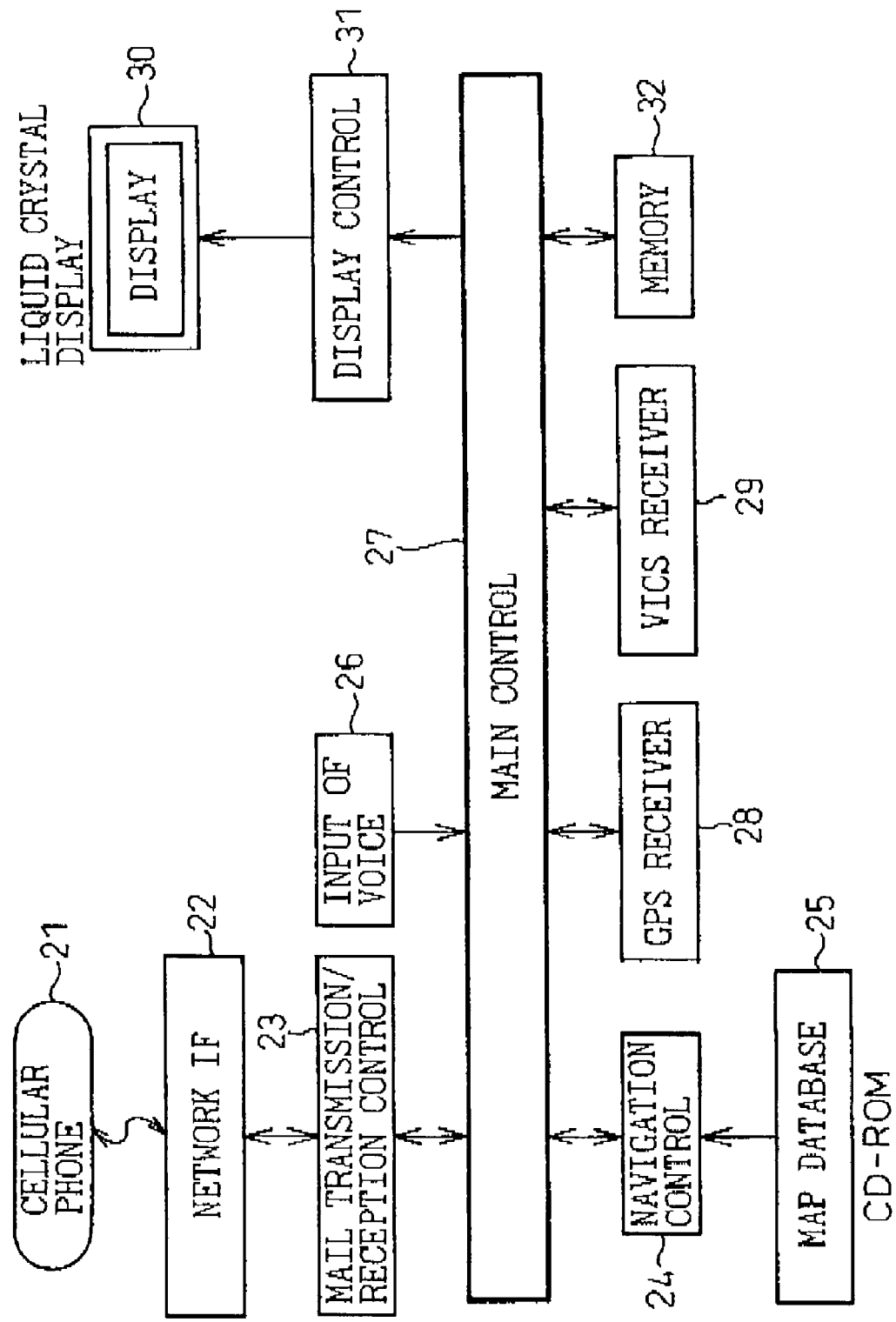

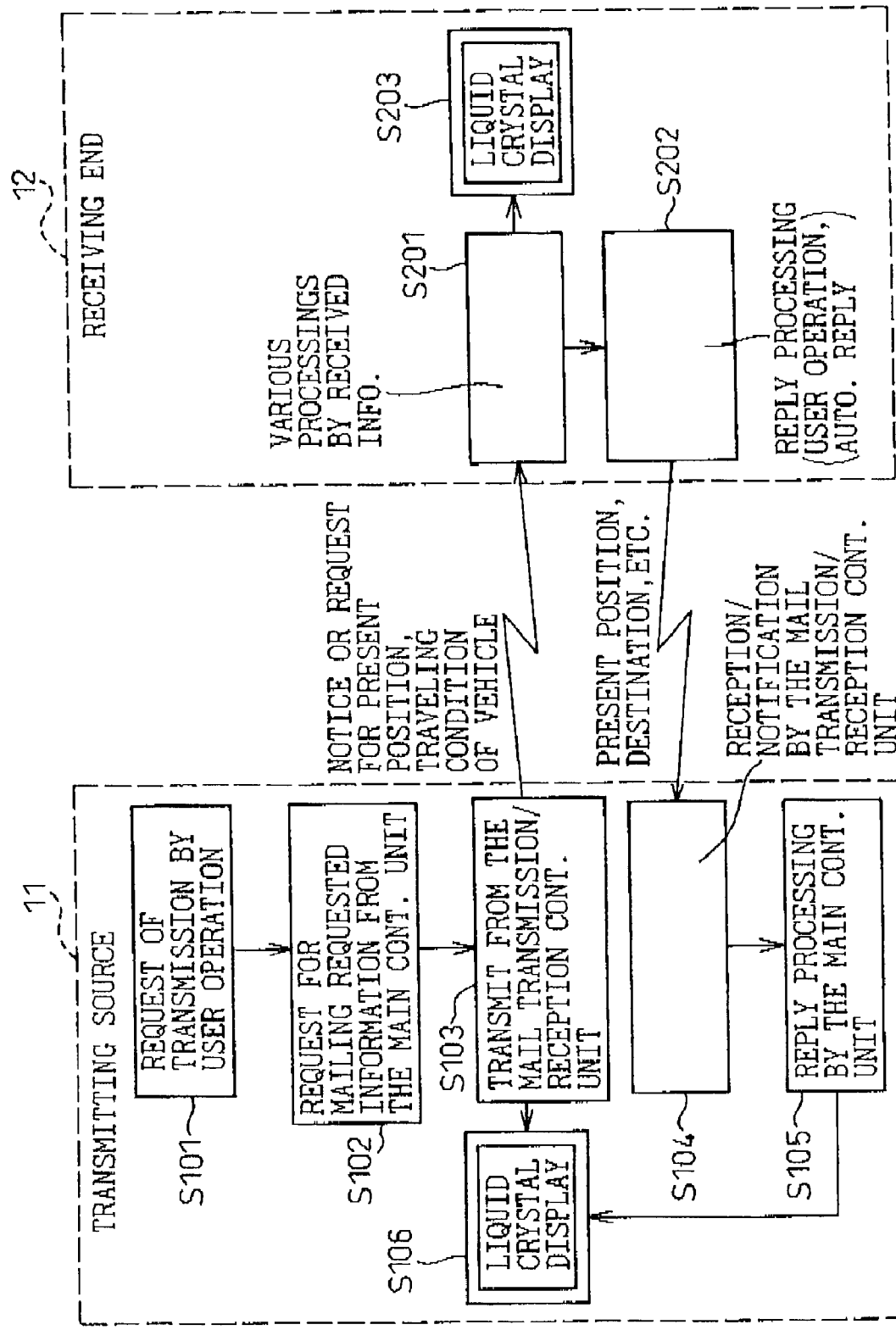

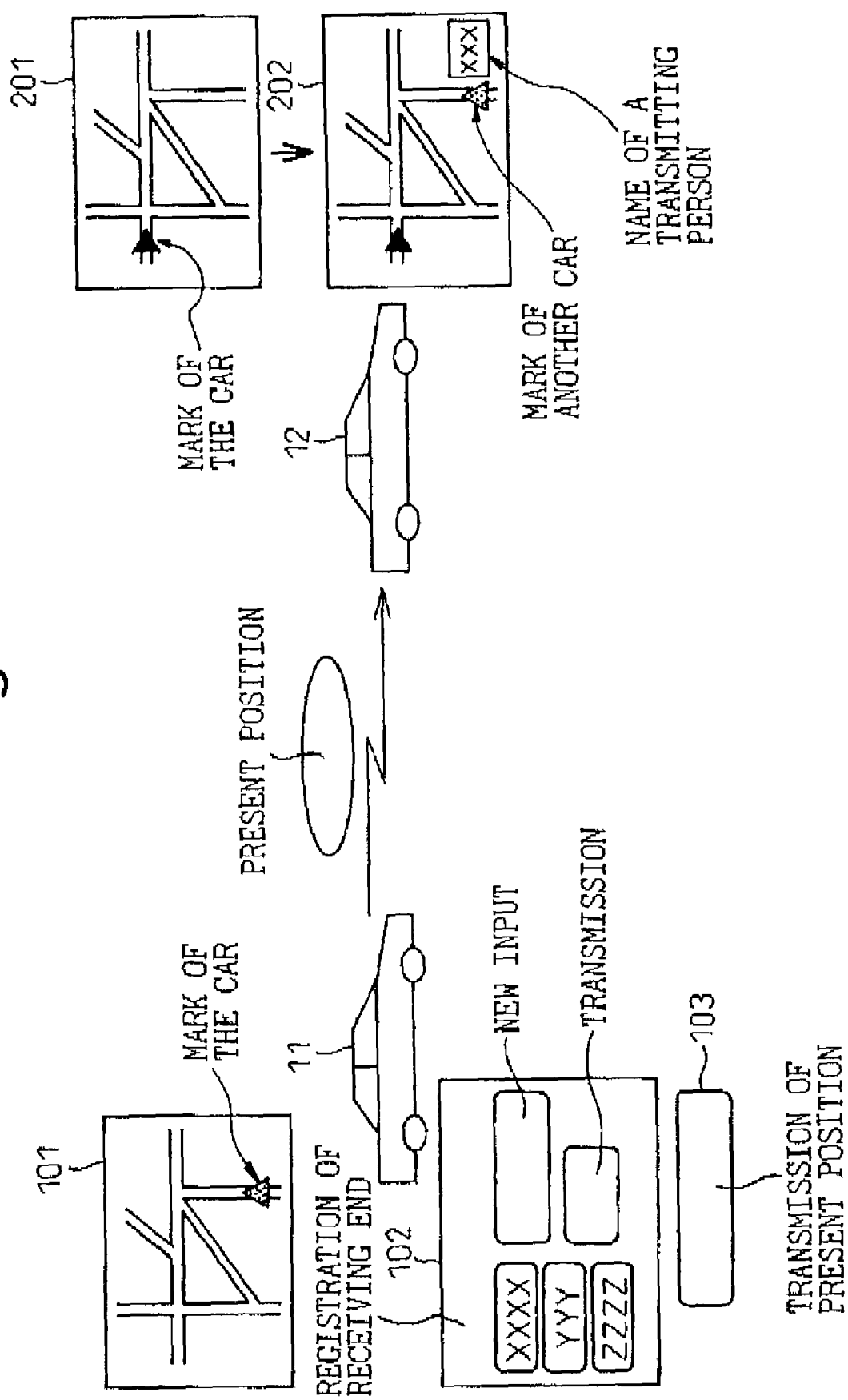

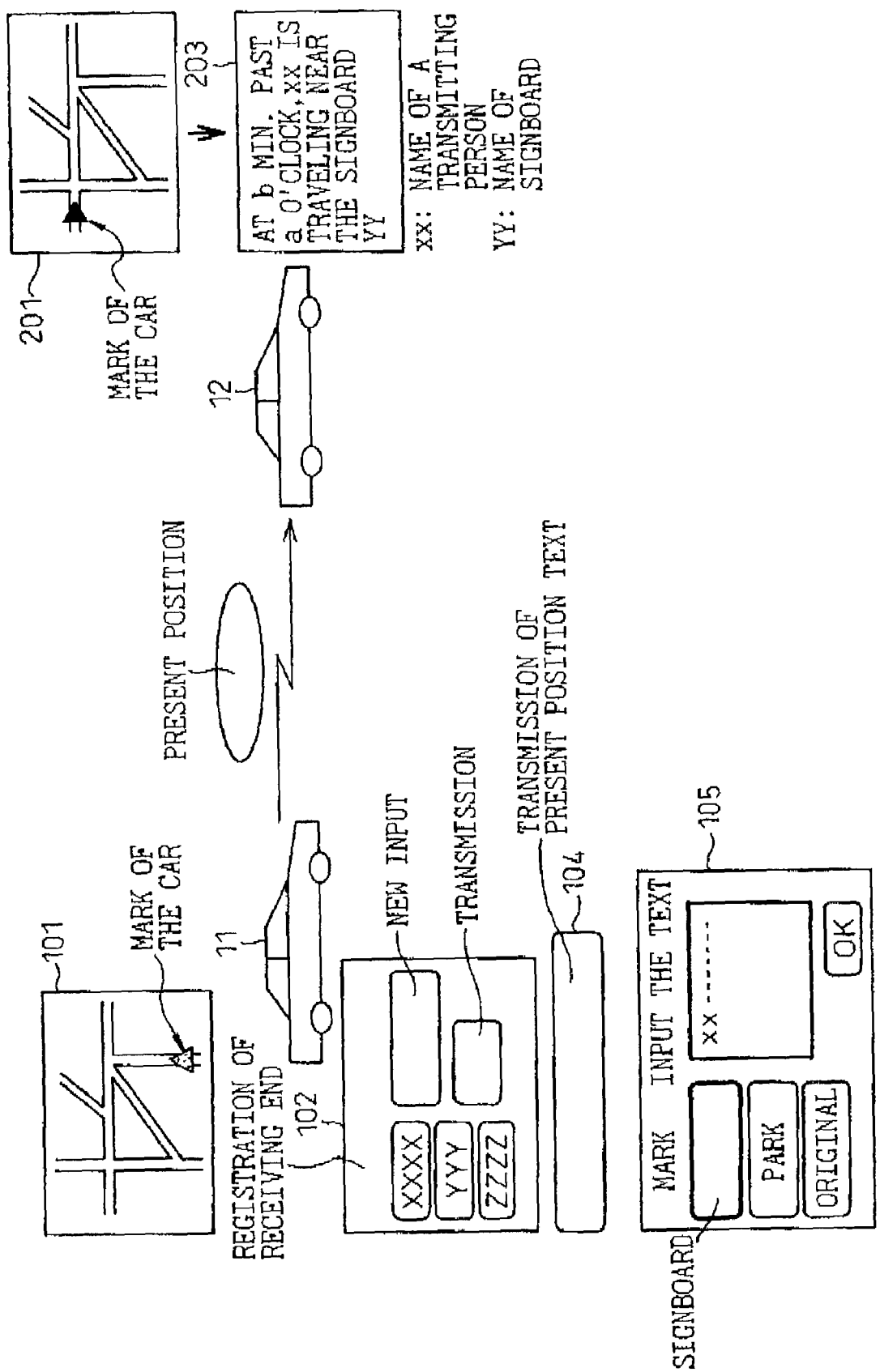

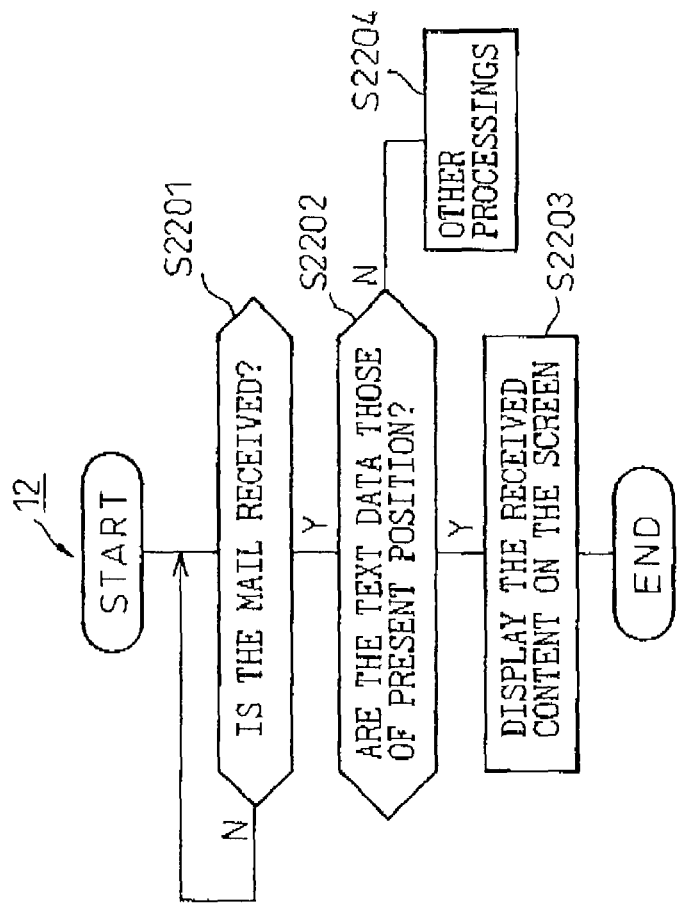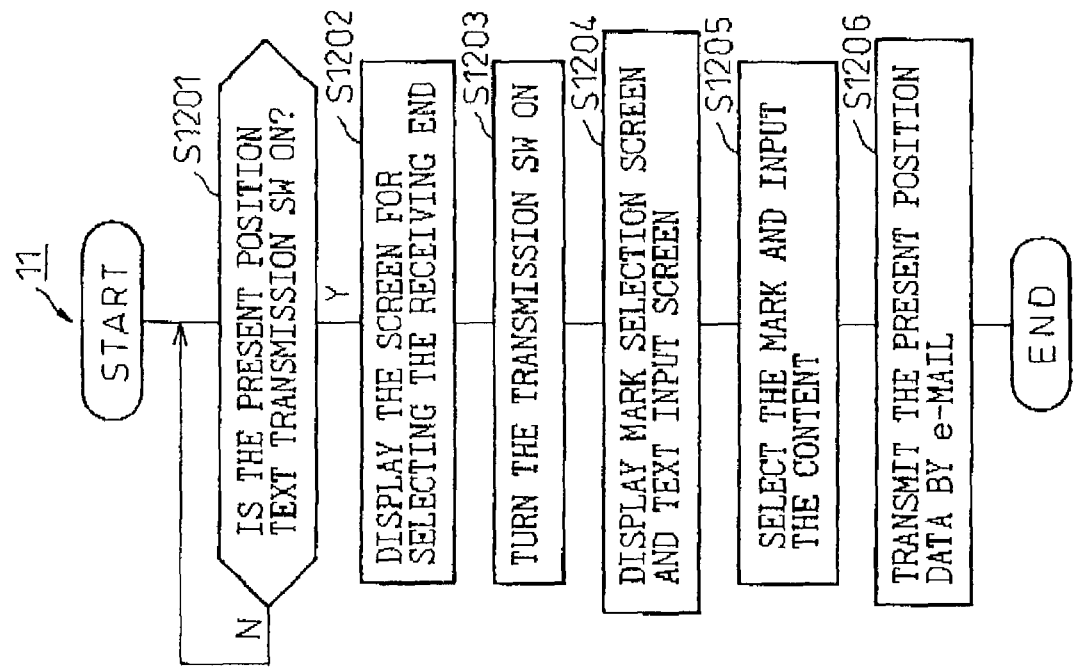

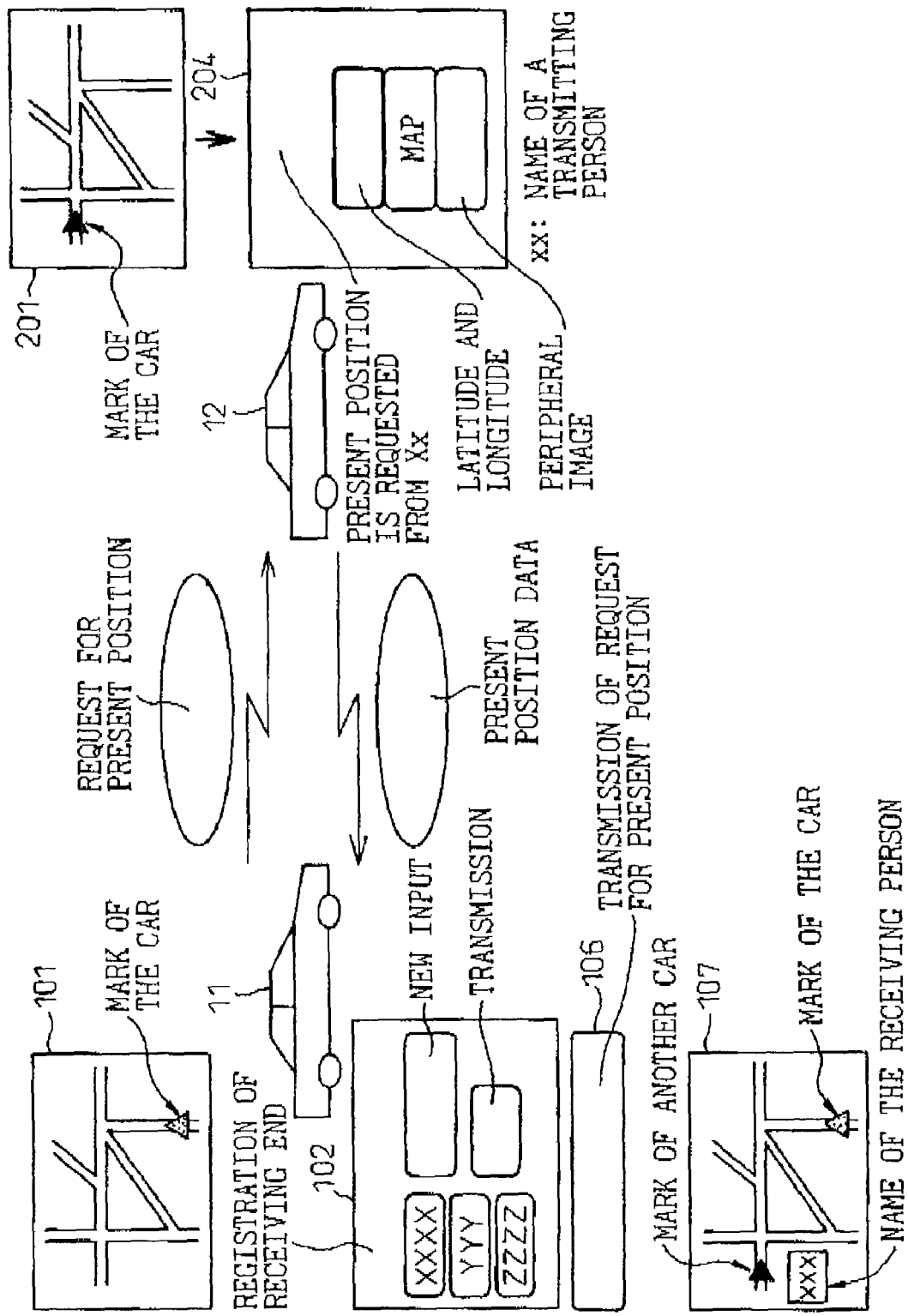

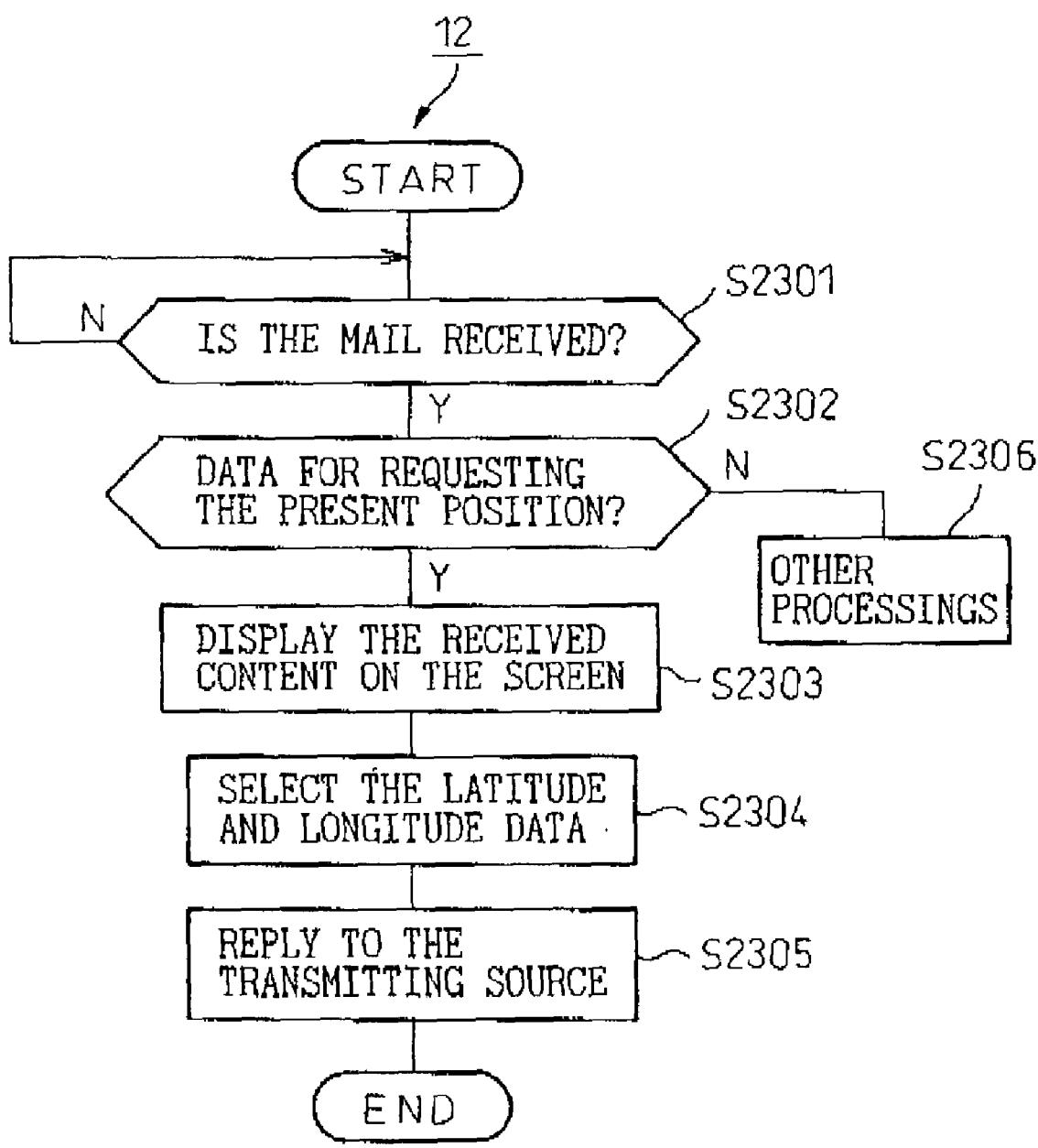

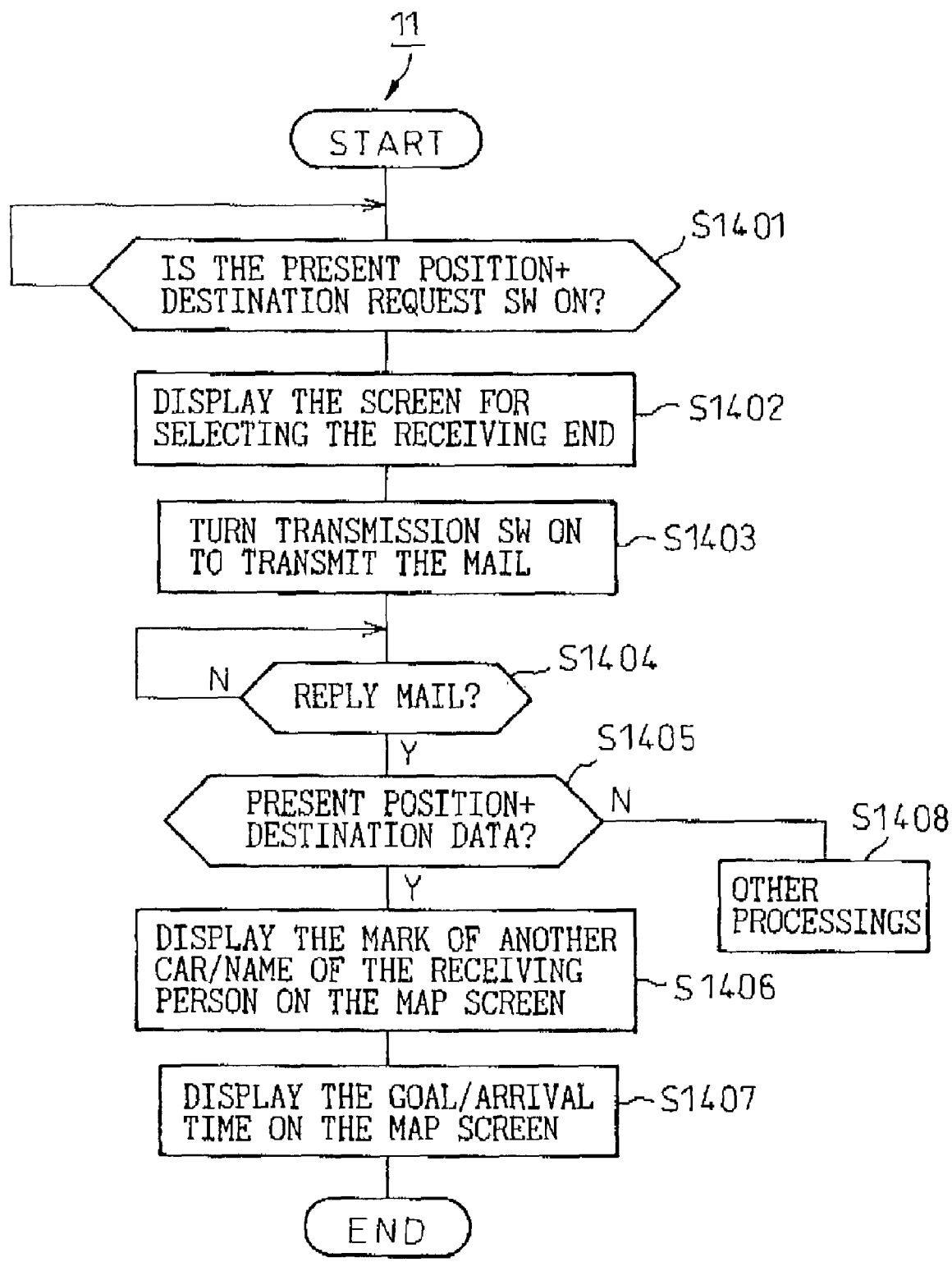

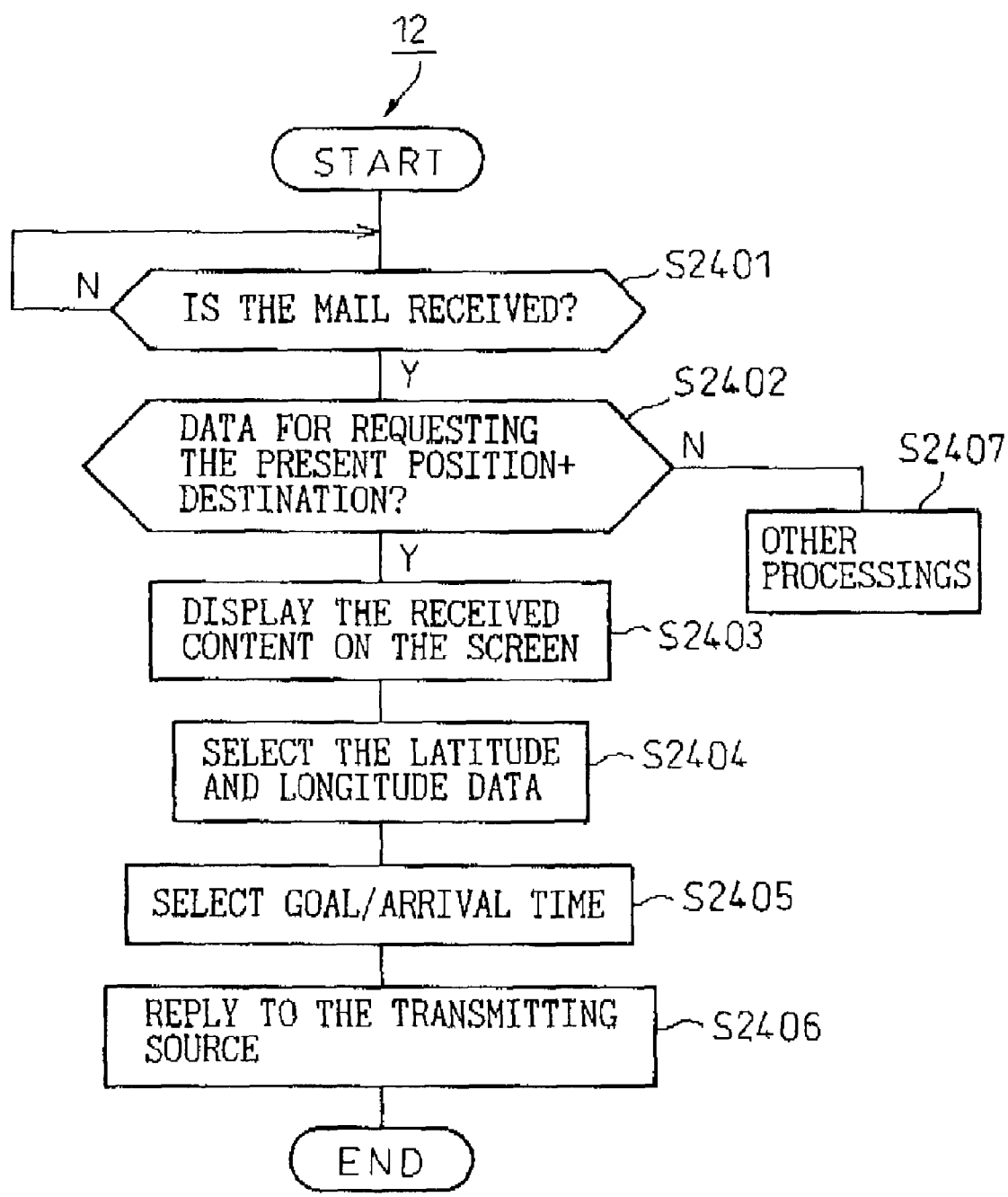

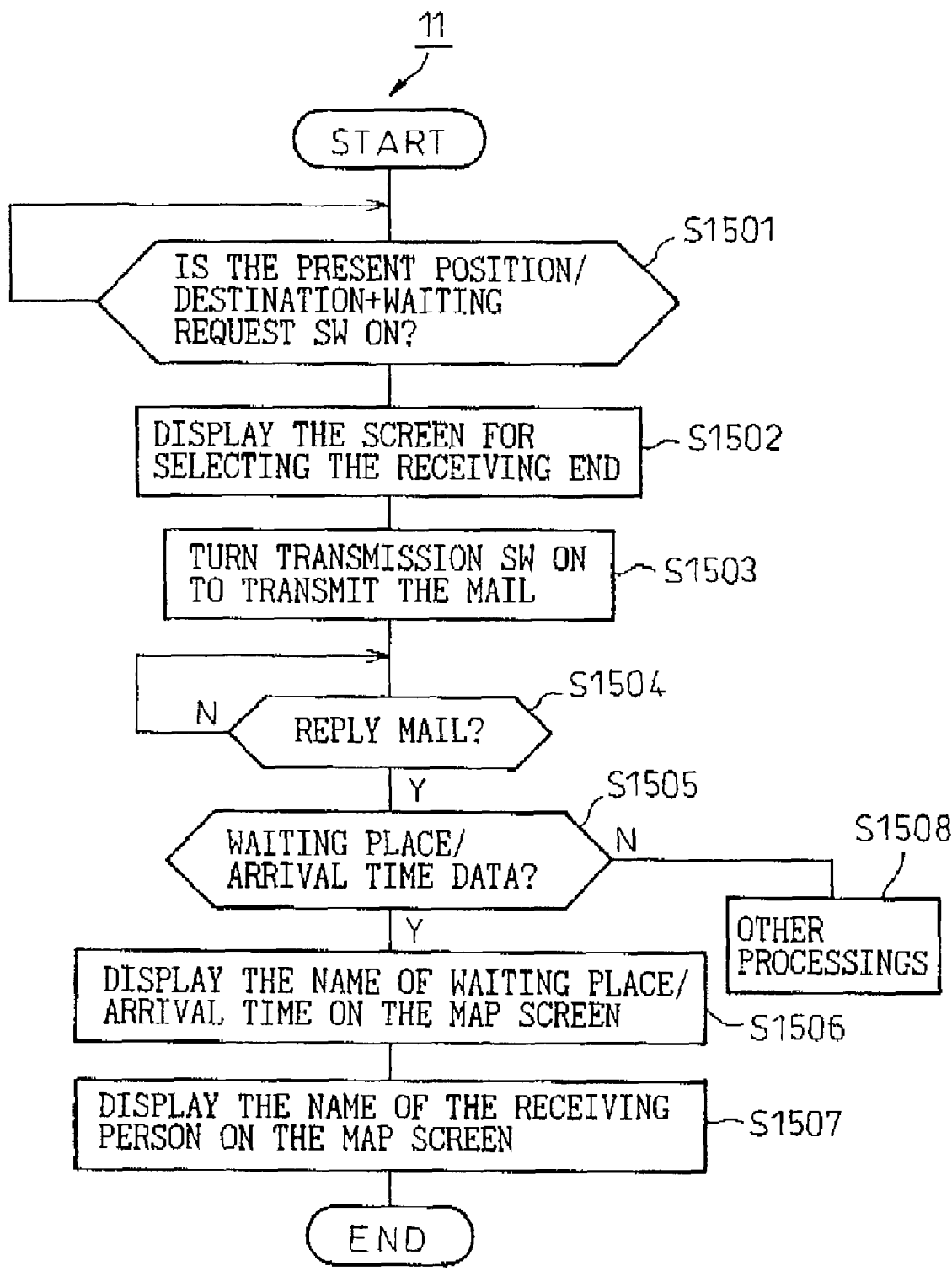

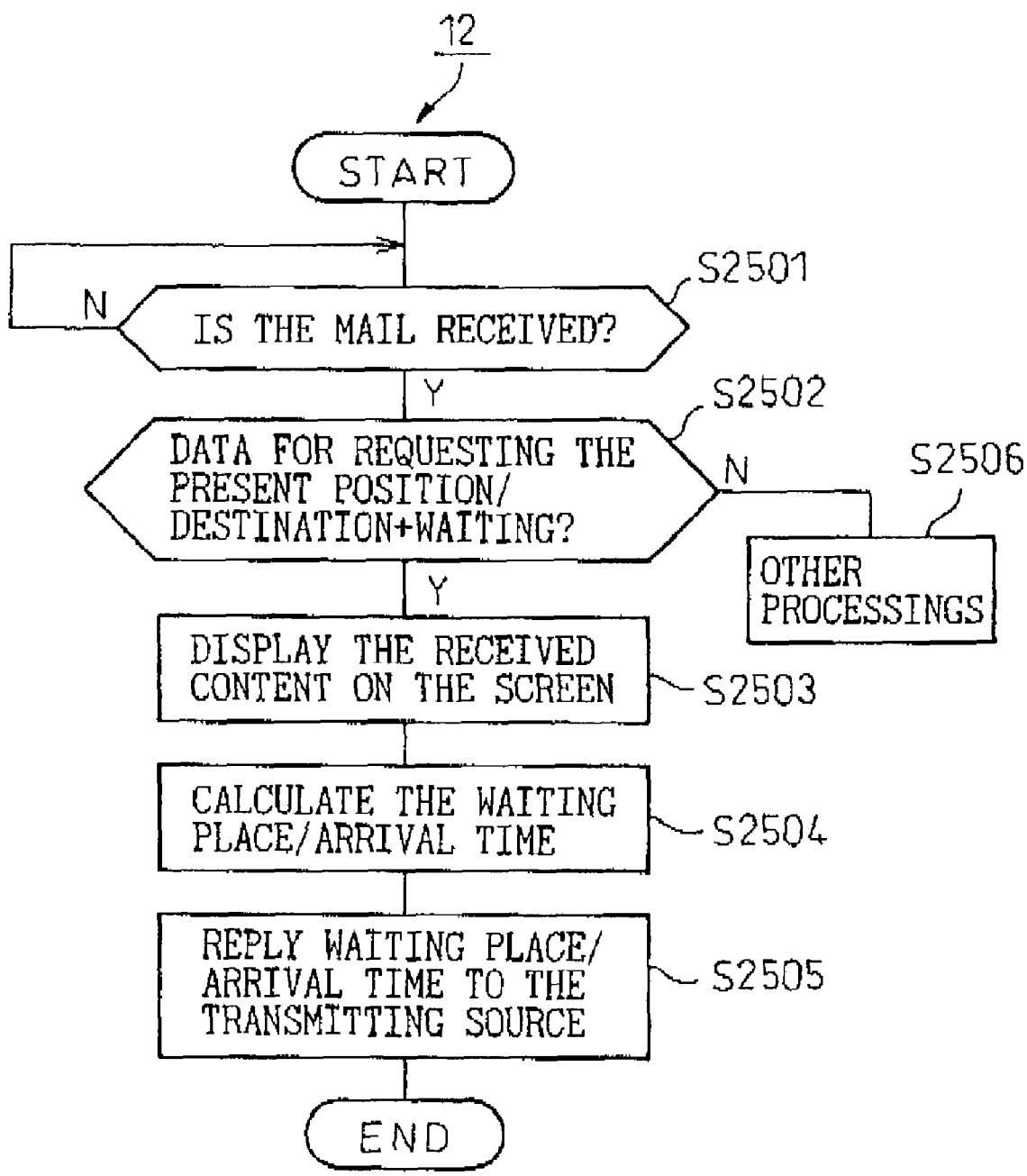

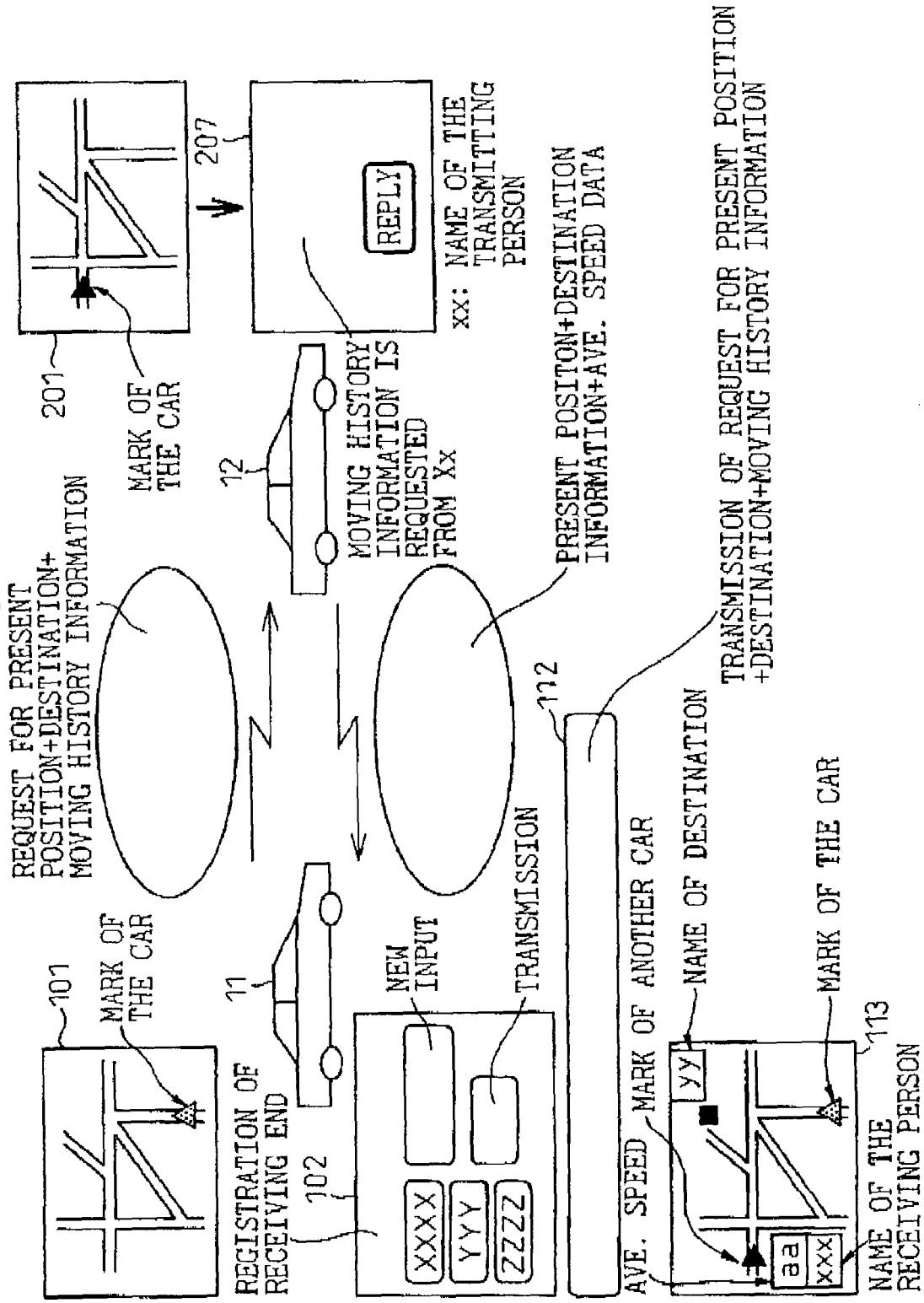

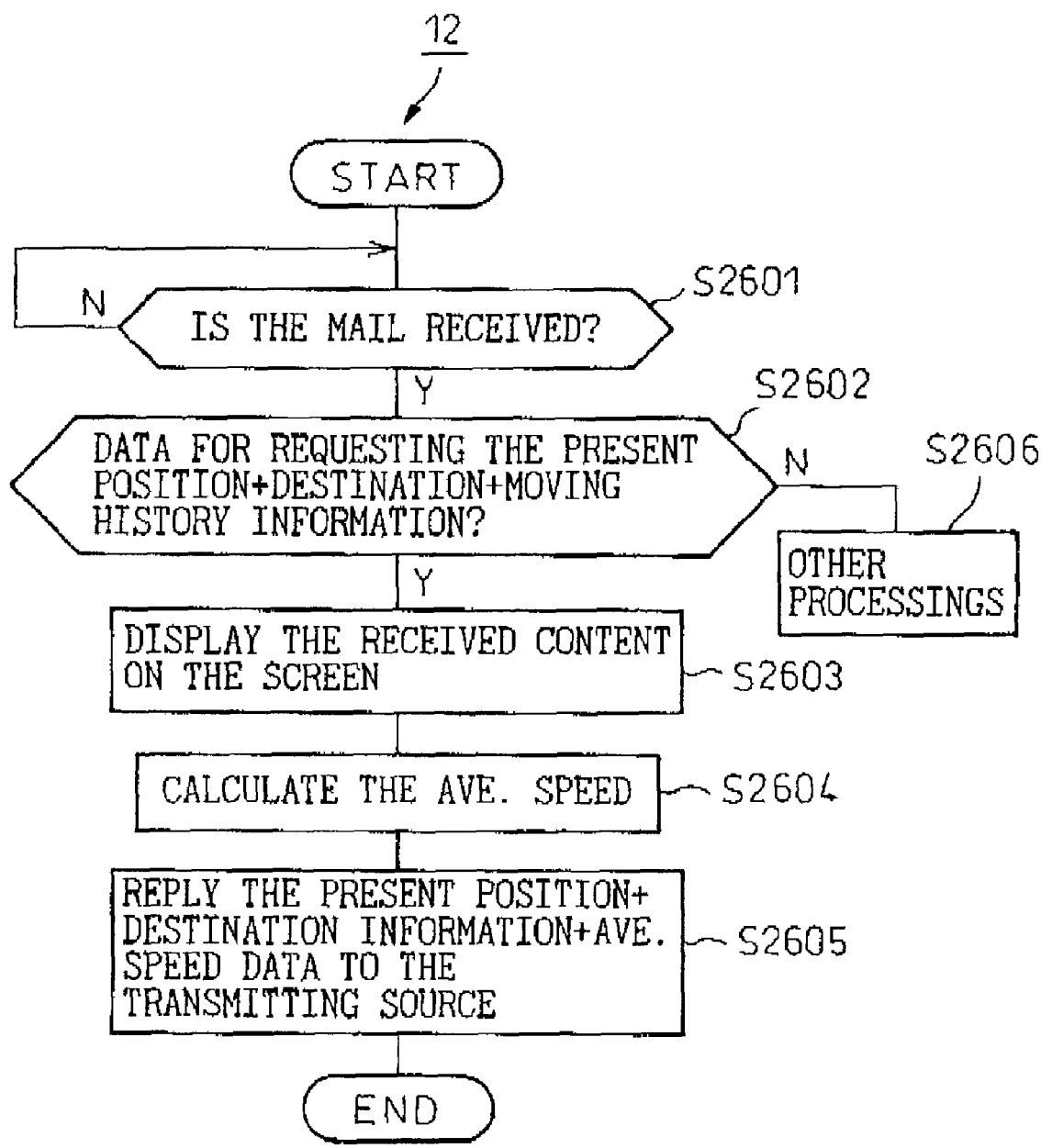

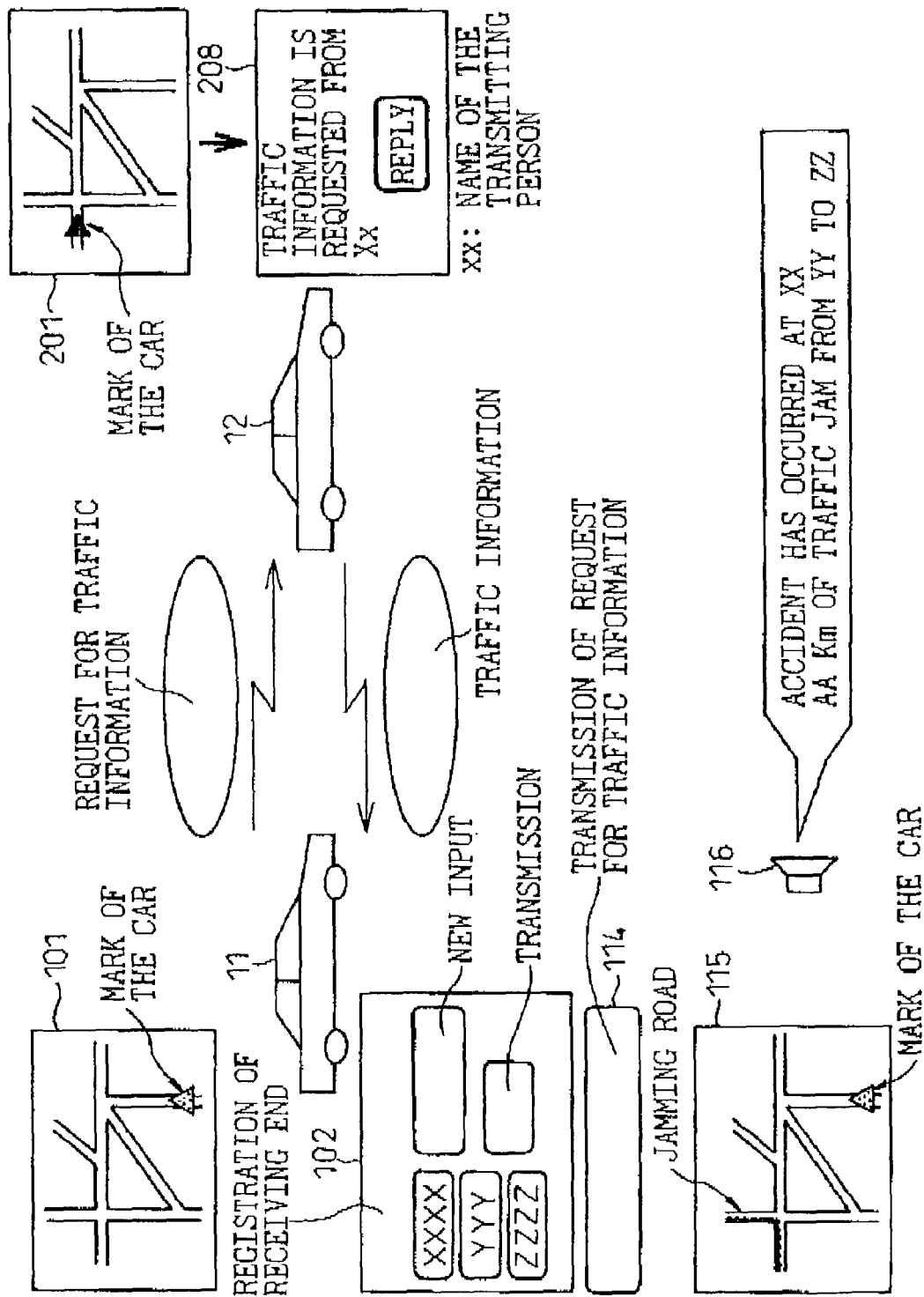

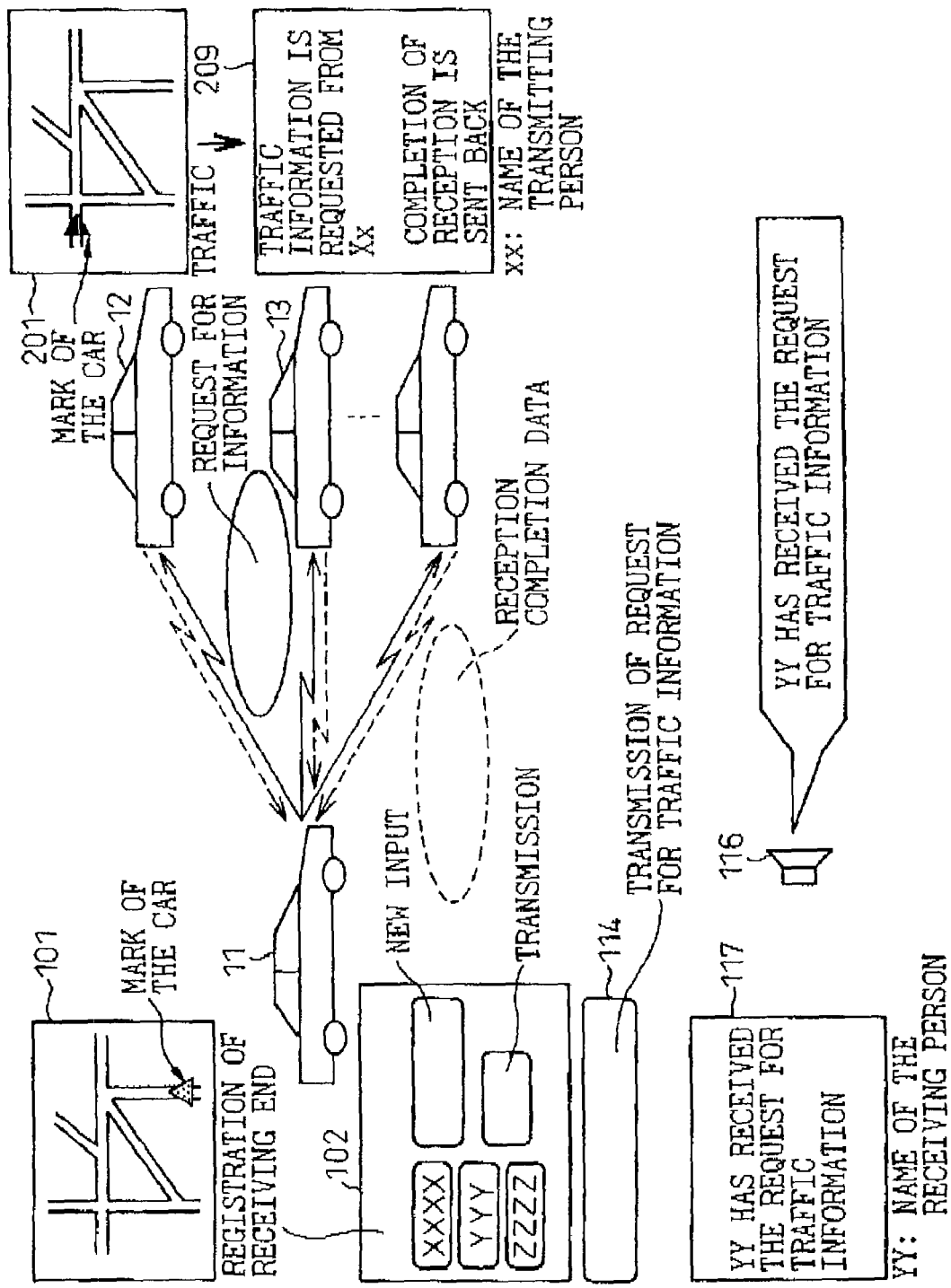

CAR MOUNTED INFORMATION DEVICE

This application claims priority to Japanese Patent Application No. 2001-296306 filed on Sep. 27, 2001.

BACKGROUND OF THE INVENTION

1. Field of the Invention

The present invention relates to a communication device. More particularly, the invention relates to a car-mounted information device, which makes it possible to obtain information (present positions, destinations, etc.) of the transmitting source and of the receiving end linked to a navigation function relying upon the end-to-end communication by using electronic mail among vehicles.

2. Description of the Related Art

Cellular phones have heretofore been used for exchanging and confirming information related to the present positions and destinations between a driver of a vehicle and a driver of another vehicle. While the vehicles are traveling, however, it is not allowed to use the cellular phones from the standpoint of preventing accidents, which is inconvenient for the drivers.

Owing to rapid progress and development of communication technologies as represented by the widespread use of the Internet in recent years, however, automobile manufacturers and related manufacturers are now building up an information service network for offering information for vehicle-mounted information devices. The automobile manufacturers are establishing information-providing companies on the basis of a charged membership system, and are providing a variety of information such as traffic information, news, weather forecasts, electronic mail, internet information, etc. to the members through an information center.

FIG. 1 schematically illustrates the above information service network system.

In FIG. 1, a vehicle 1 has an information device mounted therein which has a car navigation function and a cellular phone function, and provides access to an information center 3 through a communication network 2 constituted by a cell phone network or the like. In response to a request from the vehicle 1, the Information center 3 offers an internet service, such as traffic information, electronic mail, web surfing, etc. linked to the car navigation function.

In driving the vehicle as described above, however, it is not allowed to exchange information by speech through the cellular phone. With the system in which the automobile manufacturers offer information, further, there remains a problem from the standpoint of cost such as monthly fees due to the charged membership and fees for communication, in addition, information that is available is limited to the information possessed by the information center 3. Therefore, the driver driving the vehicle is not allowed to obtain information which he wishes to obtain at present in real time, such as present position of another vehicle, traveling conditions or traffic information, leaving a problem from the standpoint of the content of information.

SUMMARY OF THE INVENTION

In view of the above-mentioned problems, therefore, it is an object of the present invention to provide a car-mounted information device which makes it possible to obtain information of the transmitting source and of the receiving end (present positions, destinations, etc.) among vehicles easily and at a low cost, and to realize smooth and comfortable traveling by vehicles. For this purpose, the above information device makes it possible to directly obtain information of the transmitting source and of the receiving end among vehicles relying upon end-to-end communication by using electronic mail without passing through the information center or the like that was used so far, and to conduct and display the operation linked to the car navigation function for the information of the transmitting source and of the receiving end.

According to the present invention, there is provided a car-mounted information device comprising:
- a cellular phone terminal connected to an external unit;
- a car navigation function;
- a mail transmitting/receiving function for conducting, by using electronic mail, end-to-end data transmission/reception among the vehicles through the cellular phone terminal; and
- a car navigation-linking function for processing the information of the electronic mails transmitted and received by linking the information to the car navigation function.

The vehicles equipped with the information device are connected together by dial-up through the cellular phone terminals. Information of the electronic mail includes information transmitted from the vehicle of a transmitting side to the vehicle of a receiving side and is related to the vehicle of the transmitting source, or includes information returned back from the vehicle of the receiving side in response to a request from the vehicle of the transmitting side and is related to the vehicle of the receiving end.

BRIEF DESCRIPTION OF THE DRAWINGS

The present invention will be more clearly understood from the description as set forth below with reference to the accompanying drawings, in which;

FIG. 3 is a diagram illustrating a constitution of the car-mounted information device according to the present invention;

FIG. 4 is a diagram illustrating a procedure of fundamental communication by using electronic mail between the vehicles;

FIG. 5 is a diagram illustrating a first embodiment of the present invention;

FIG. 7 is a diagram illustrating a second embodiment of the present invention;

FIG. 8A is a flowchart of notice control of FIG. 7;

FIG. 8B is a flowchart of reception control of FIG. 7;

FIG. 9 is a diagram illustrating a third embodiment of the present invention;

FIG. 10B is a flowchart of reply control of FIG. 9;

FIG. 12A is a flowchart of request control of FIG. 11;

FIG. 12B is a flowchart of reply control of FIG. 11;

FIG. 14A is a flowchart of request control of FIG. 13;

FIG. 14B is a flowchart of reply control of FIG. 13;

FIG. 15 is a diagram illustrating a sixth embodiment of the present invention;

FIG. 16B is a flowchart of reply control of FIG. 15;

FIG. 17 is a diagram illustrating a seventh embodiment of the present invention;

FIG. 19 is a diagram illustrating an eighth embodiment of the present invention;

DESCRIPTION OF THE PREFERRED EMBODIMENTS

Figure 1:
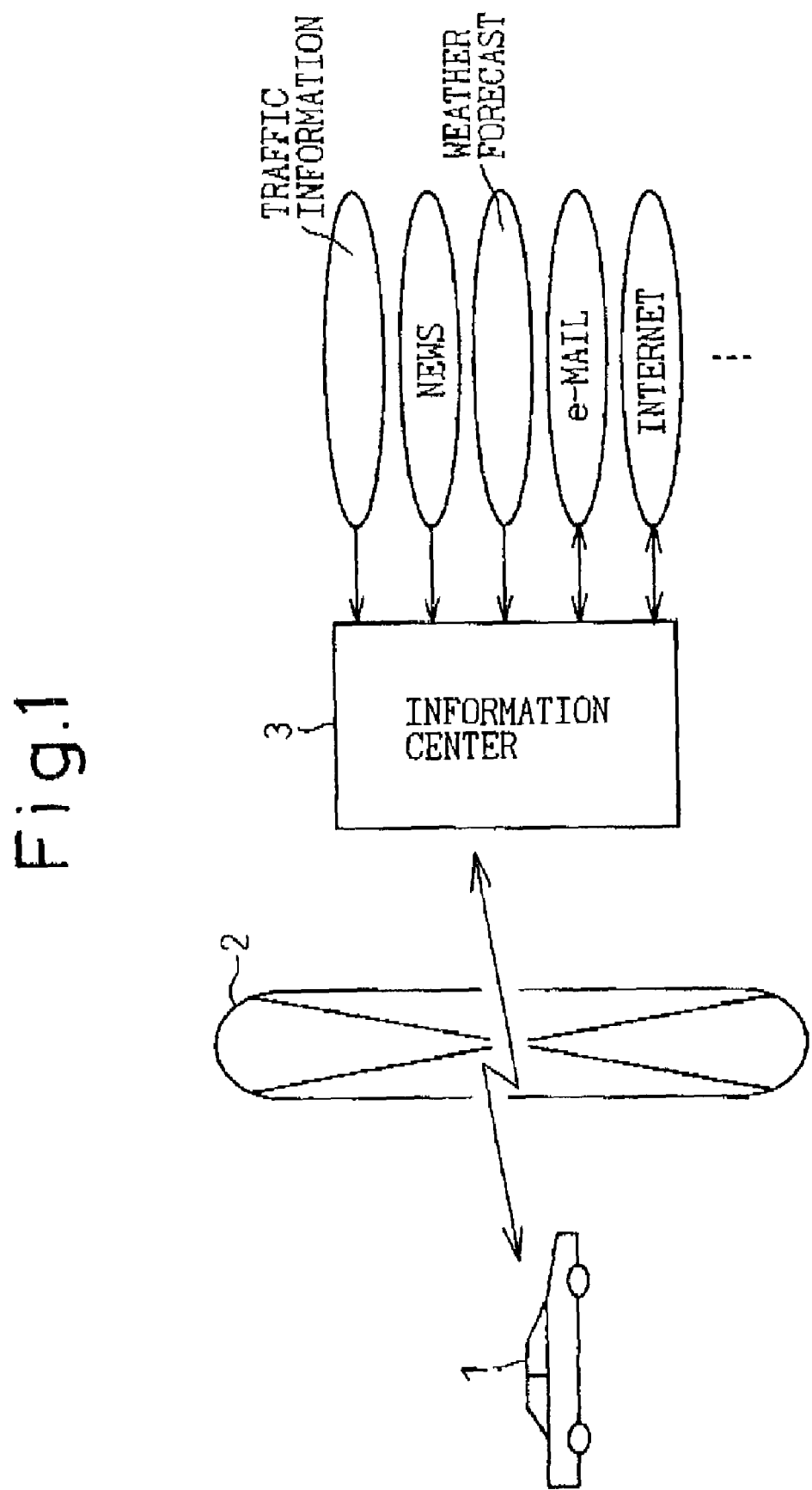
FIG. 1 is a diagram schematically illustrating a conventional information service network system.
Figure 2:
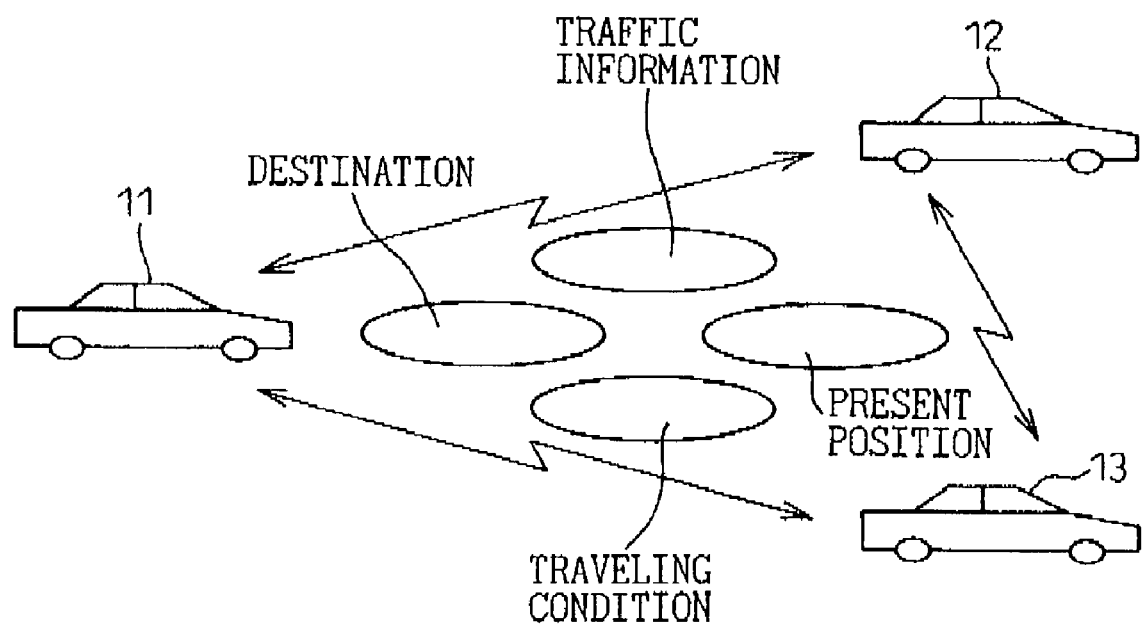
FIG. 2 is a diagram illustrating the constitution of fundamental communication among the vehicles mounting the information devices according to the present invention.

FIG. 2 is a diagram illustrating the constitution of fundamental communication among vehicles in which are mounted the information devices according to the present invention.

Referring to FIG. 2, a vehicle 11 executes end-to-end communication with another vehicle 12 or 13 by using the car-mounted information device of the present invention. As an example, the vehicle 11 that is traveling transmits a dial signal to the vehicle 12 that is also traveling by using a modem function of the information device through the cellular phone that is connected to the information device. When the signal is received by the vehicle 12 having the same device constitution, a radio circuit is established between the vehicle 11 and the vehicle 12 that are traveling to directly connect them together through a mobile communication network.

In this embodiment, the mail transmitting/receiving function of the information devices of the vehicles 11 and 12 start transmitting and receiving electronic mail through the radio circuit, and information such as present positions and traveling conditions is exchanged between the vehicles 11 and 12 that are traveling, i.e., between the two points (end to end). The received information of the transmitting source and of the receiving end is readily displayed on the display of the vehicle of the receiving end by using the navigation-linking function of the information device, similar communication is conducted between the vehicles 12 and 13, and between the vehicles 13 and 11. Therefore, the communication requires no traditionally employed communication center.

FIG. 3 is a diagram illustrating a constitution of the car-mounted information device according to the present invention.

The information device of FIG. 3 includes a modem function for effecting transmission and reception of data between the vehicles through a cellular phone 21 connected to an external unit while setting a circuit by conducting a physical end-to-end radio circuit setting/establishing processing, a mail transmitting/receiving function for transmitting and receiving electronic mail, and a car navigation-linking function for linking information of the received electronic mail to the information of car navigation to output the information to the display.

A network IF unit 22 is a portion that corresponds to the modem function, and is equipped with a modem constituted by hardware or software, and uses PPP (point-to-point protocol) as a protocol for the dial-up access. The network IF unit 22 is provided with a socket for connection to the cellular phone through a cable.

In the network IF unit 22 executes a PPP client/server process. In the example of FIG. 2, the dial-up connection processing is executed by controlling the modem when a signal is transmitted from the vehicle 11, and the automatic reception processing is executed as a remote access server through the modem when the signal is received by the vehicle 12. When the signal is received, the user is authenticated relying upon a user ID and a password of the vehicle 11 of the transmitting side relying upon the PAP (personal authentication protocol) or the CHAP (challenge authentication protocol), and a data link based upon PPP is established between the vehicle 11 and the vehicle 12 when the user authentication is completed.

A mail transmission/reception control unit 23 is a portion that corresponds to the mail transmitting/receiving function, and transmits and receives the electronic mail based on the TCP/IP (transmission control protocol/internet protocol) between the vehicle 11 and the vehicle 12 via the data link that is established. SMTP (simple mail transfer protocol) and POP (post office protocol) are used for the electronic mail application, and an SMTP/POP server process operates in the mail transmission/reception control unit 23.

Further, the electronic mail uses a MIME (multipurpose internet mail extension) for transmitting map data and voice data other than the text. Further, a so-called private address is used for the IP address that represents the transmitting source/receiving end. The IP address may be assigned in a fixed manner for each of the vehicles or may be assigned in a dynamic manner when the signal is received.

The parts other than those described above are portions corresponding to those of a conventional car navigation function. The car navigation-linking function processes information obtained through the mail transmitting/receiving function and information from the conventional car navigation function by linking them together. Therefore, the constituent portion of the conventional car navigation function can be directly used. The main control unit 27, however, executes the process for transmitting and receiving the mail relative to the mail transmission/reception control unit 23 in addition to executing the car navigation process.

For example, when the main control unit 27 receives a notice of reception of mail from the main transmission/reception control unit 23, the received mail spooled in the mail box is read out in response to the POP command, the contents are analyzed, and those related to car navigation information are displayed overlaid on the map data on the display 30.

The main control unit 27, on the other hand, instructs the mail transmission/reception control unit 23 to transmit the electronic mail to which is attached the information of the transmitting source by sending a mail command. The main control unit 27, further, displays a menu related to the transmission and reception of information of the transmitting source and of the receiving end on the display 30, and executes a variety of processes depending upon the items selected by the user.

A navigation control unit 24 executes the navigation control based upon a map database 25 of CD-ROM, position data from a GPS receiver 28 and/or traffic information from a VICS receiver 29. A display control unit 31 executes a drawing control for displaying the data stored in a memory 32 on the display 30. Here, the main control unit 27 totally controls the mail transmission/reception control unit 23, navigation control unit 24, GPS receiver 28 and display control unit 31.

FIG. 4 is a diagram illustrating a fundamental procedure for notifying the information of the transmitting source, such as the present position and the traveling state of the vehicle, and for requesting the information of the receiving end.

Here, the wireless circuit has already been established between the transmitting vehicle 11 and the receiving vehicle 12 due to the dial-up connection from the transmitting vehicle 11, and it is ready to transmit and receive electronic mail between the two vehicles 11 and 12.

In the vehicle 11 which is the transmitting source, first, the user requests the transmission by selecting the "Transmission" out of the menu displayed on the display 30 (S101). Upon receipt of this request, the main control unit 27 instructs the mail transmission/reception control unit 23 to transmit the mail temporarily stored in the transmission buffer (S102). The mail transmission/reception control unit 23 transmits the mail to the vehicle 12 which is the receiving end, and displays the completion of transmission on the display 30 (S103 and 5106).

In the vehicle 12 which is the receiving end, the mail received by the mail transmission/reception control unit 23 is once stored in the mail box, and the main control unit 27 is informed of the reception of mail (S201). The main control unit 27 reads the mail that is received, displays the result of analysis of the content thereof on the display 30 and, as required, forms a replay mail and instructs the mail transmission/reception control unit 23 to transmit it (S203). The mail transmission/reception control unit 23 transmits the reply mail to the vehicle 11 which is the transmitting source (S202).

In the vehicle 11 which is the transmitting source, the reply mail received by the mail transmission/reception control unit 23 is once preserved in the mail box, and the main control unit 27 is informed of the reception of mail (S104). The main control unit 27 reads the reply mail and displays the result of analysis of the content thereof on the display 30 (S105 and S106).

When the information of the transmitting source (present position, traveling condition of the vehicle, etc.) is transmitted from the transmitting source to the receiving end in accordance with the above-mentioned procedure, the above information of the transmitting source is attached to the transmission mail, and a reply mail in response thereto includes information related to confirming the reception of the mail. When the information of the receiving end (present position, traveling condition of the vehicle, etc.) is to be requested, on the other hand, the transmission mail includes information requesting the transmission of mail. To the reply mail in response thereto is attached the information of the receiving end.

Embodiments of the present invention will now be concretely described.

Figure 6B:
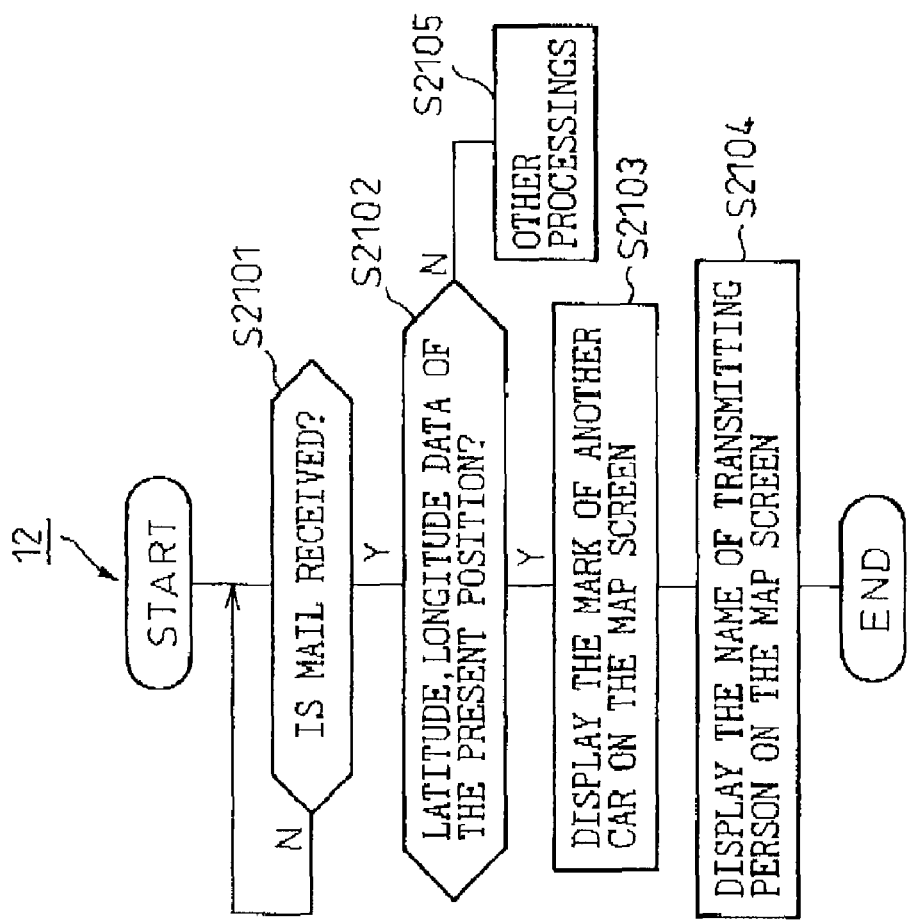
FIG. 6B is a flowchart of reception control of FIG. 5.
Figure 6A:
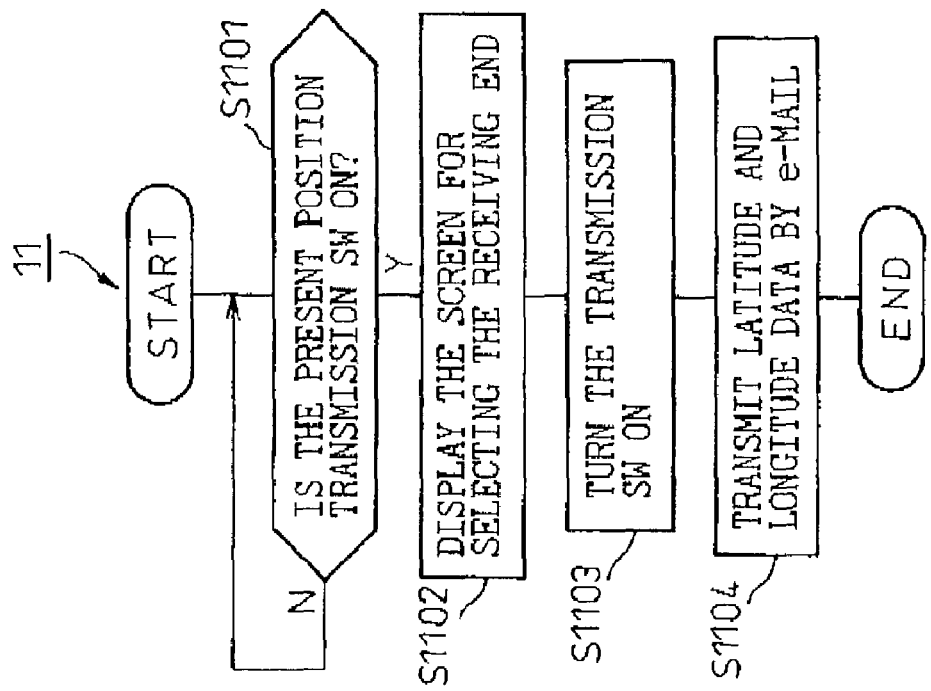
FIG. 6A is a flowchart of notice control of FIG. 5.

FIGS. 5, 6A and 6B illustrate a first embodiment of the present invention. FIG. 5 schematically illustrates a procedure by which the vehicle 11 of the transmitting side notifies the "present position (latitude and longitude)" to the vehicle 12 of the receiving side. FIG. 6A is a flowchart of notice control of the vehicle 11, and FIG. 6B is a flowchart of reception control of the vehicle 12.

The user of the vehicle 11, first, depresses a "Present Position Transmission" button 103 on the display to notify the present position of his vehicle (see screen 101) to the vehicle 12. Then, a screen 102 for selecting the registration of the receiving end is displayed. The user selects a button (e.g., "XXXX") that represents the vehicle 12 or its user's name and, then, depresses the "Transmission" button. Thereafter, the information of the transmitting source (latitude and longitude of the present invention) is transmitted to the vehicle 12 according to the procedure shown in FIG. 4.

Here, if the radio circuit has not been established between the vehicle 11 and the vehicle 12, the vehicle 11 starts with the procedure for dial-up connection to the vehicle 12 (S1101 to S1104).

Upon receipt of the data related to the latitude and longitude representing the present position from the vehicle 11, the vehicle 12 displays, overlaid on the map screen (202), the position mark of the vehicle 11 notified in addition to the position mark of the vehicle 12 on the display. In this embodiment, the "name of the transmitting person", too, is displayed near the position mark of the vehicle 11 (S2101 to S2105).

FIGS. 7, 8A and 8B illustrate a second embodiment of the present invention which corresponds to a modified example of the above-mentioned first embodiment. FIG. 7 schematically illustrates a procedure by which the vehicle 11 of the transmitting side notifies the "present position (text data)" to the vehicle 12 of the receiving side. FIG. 8A is a flowchart of notice control of the vehicle 11, and FIG. 6B is a flowchart of reception control of the vehicle 12.

The user of the vehicle 11, first, depresses a "Present Position Text Transmission" button 104 on the display to notify the present position of his vehicle (see screen 101) to the vehicle 12. Then, a screen 102 for selecting the registration of the receiving end is displayed. The user selects a button (e.g., "XXXX") that represents the vehicle 12 or its user's name and, then, depresses the "Transmission" button. Then, the mark selection screen and the text input screen (105) are displayed. In this embodiment, the "Signboard" is selected as a mark, and an "OK" button is depressed. Then, the information of the transmitting source (text data representing the present position in this embodiment) is transmitted to the vehicle 12.

Upon receipt of the text data representing the present position from the vehicle 11, the vehicle 12 changes the screen over to a text screen (203) to display the content that is received (S2201 to S2204). The content of the text to be displayed may be transmitted in a form in which selected words are inserted in a fixed form sentence like "AT THE PRESENT TIME OF b MINUTES PAST a O'CLOCK, xx IS TRAVELING NEAR THE SIGNBOARD YY". Or, conversely, the sentence to be inserted may be assembled on the receiving side. As described above, the input of text by the user can be simplified by using a fixed form sentence or by selecting the name of a station or a park that serves as a mark near the vehicle, by selecting a local name specific to the area which is not listed in the map database, or by selecting a signboard or a logo mark.

Further, the text data may be such that a voice explaining the scenery or the landmark in the vicinity is input through a microphone of the voice input unit 26 of FIG. 3, and is transformed into text data upon recognizing the voice. Further, an "ORIGINAL" button may be depressed to attach an image file such as a predetermined building or the like that has been preserved in advance, or a building or a signboard that serves as a mark at that moment may be imaged by using a camera mounted on the vehicle to attach it as a static image file or a dynamic image file.

Figure 10A:
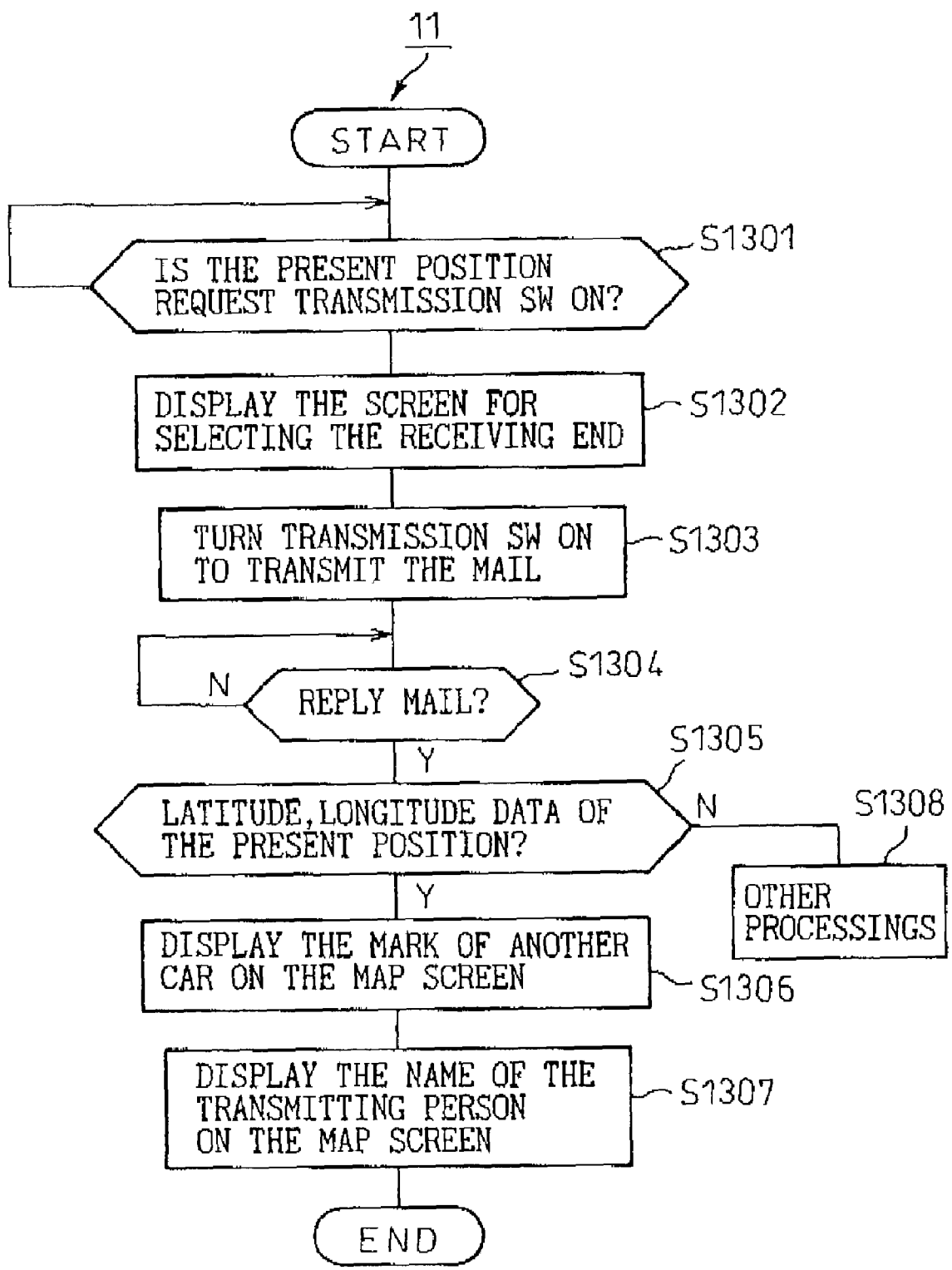
FIG. 10A is a flowchart of request control of FIG. 9.

FIGS. 9, 10A and 10B illustrate a third embodiment of the present invention. FIG. 9 schematically illustrates a procedure by which the vehicle 11 of the transmitting side requests a reply from the vehicle 12 concerning the "present position". FIG. 10A is a flowchart of request control of the vehicle 11, and FIG. 6B is a flowchart of reply control of the vehicle 12.

The user of the vehicle 11, first, depresses a "Present Position Request" button 106 on the display to request a reply from the vehicle 12 concerning the present position (see screen 201). Then, a screen 102 for selecting the registration of the receiving end is displayed. The user selects a button (e.g., "XXXX") that represents the vehicle 12 or its user's name, and then depresses the "Transmission" button. Here, a state is established waiting for the reception of the reply mail. When the reply mail including the information of the receiving end (latitude and longitude of the present invention) is received, the position mark of the vehicle 12 notified in addition to the position mark of the vehicle on display being displayed superimposed on the map screen (107) together with the "name of the receiving person" ((S1301 to S1308).

Upon receipt of the mail requesting the present position from the vehicle 11, the vehicle 12 displays the received content and a reply menu screen (204) corresponding thereto on the display. In this embodiment, the user of the vehicle 12 selects the latitude and longitude of default. Then, the reply mail including the information of the receiving end (latitude and longitude of the present position) is transmitted to the vehicle 11 of the transmitting side (S2301 to S2306).

In this embodiment, the user on the receiving side selects the latitude and longitude as the present position by a manual operation. However, the "latitude and longitude" of default may be automatically replied from the receiving end, or either the manual reply or the automatic reply may be selected on the receiving end. It is further allowable to specify the kind of the present position data that is to be sent in response to the present position request mail from the transmitting side.

As another embodiment at the time of reply, the privilege for reply may be limited to particular users only. In this case, the authentication is effected based on the user ID or password at the time of replying to the mail. It is further allowable to limit the time or the area for automatic reply to the request of the present position. For example, the date (time band, date, day, etc.) for receiving the request of the present position may be limited, the distance (e.g. not longer than one kilometer) between the present position of the transmitting source and the present position of the receiving end may be limited, or the reply area (within Tokyo area, etc.) may be limited.

Figure 11:
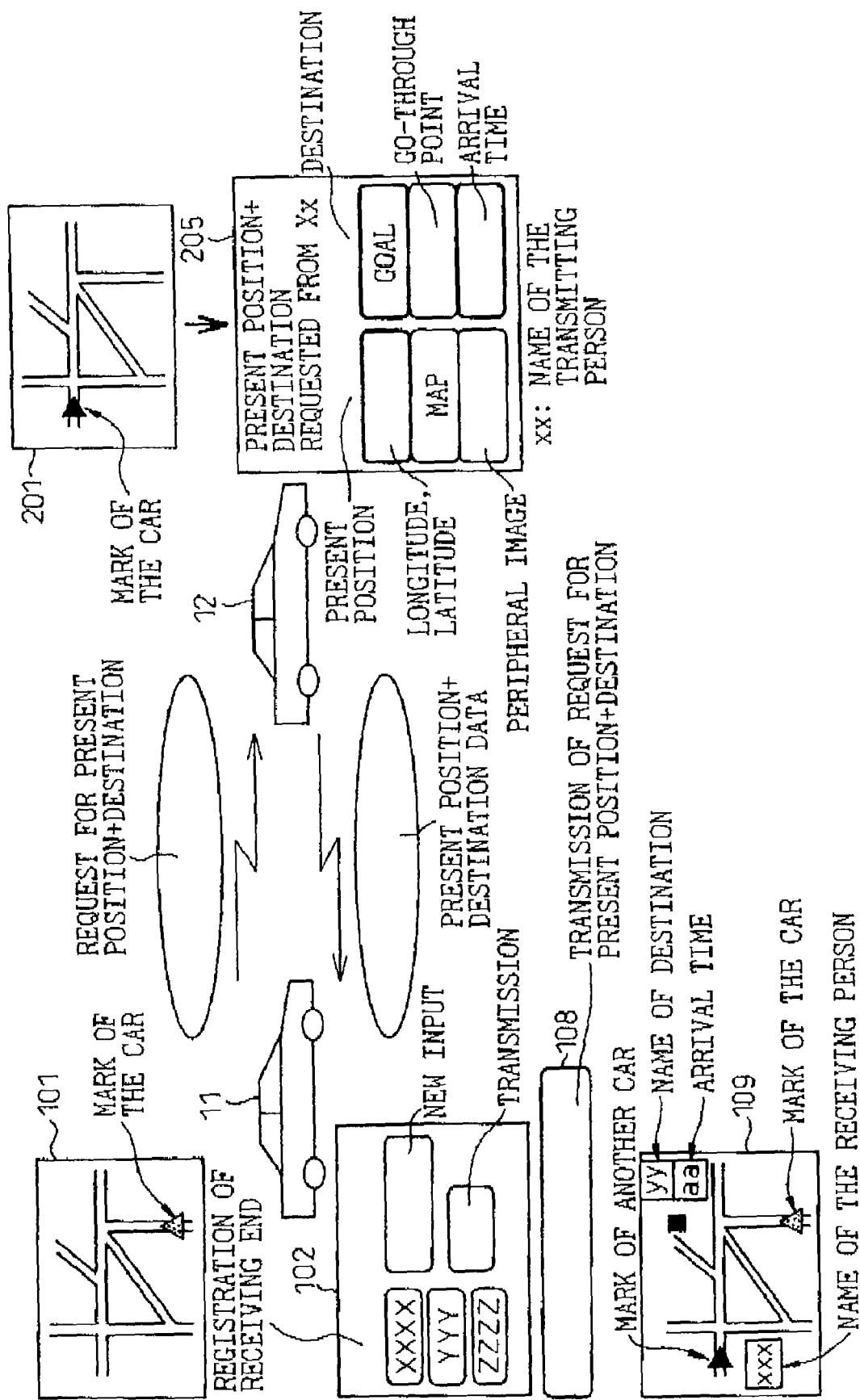
FIG. 11 is a diagram illustrating a fourth embodiment of the present invention.

FIGS. 11, 12A and 12B illustrate a fourth embodiment of the present invention which corresponds to a modified example of the above third embodiment. FIG. 11 schematically illustrates a procedure by which the vehicle 11 of the transmitting side requests a reply from the vehicle 12 of the receiving side concerning the "present position+destination". FIG. 12A is a flowchart of request control of the vehicle 11, and FIG. 12B is a flowchart of reply control of the vehicle 12.

The user of the vehicle 11, first, depresses a "Present Position+Destination Request" button 108 on the display to request the reply to the vehicle 12 concerning the present position+destination. Thereafter, the procedure is the same as that of the third embodiment except that the information of the receiving end from the vehicle 12 includes the destination ("goal" and "arrival time" data in this embodiment) in addition to the present position (latitude and longitude). Upon receipt of the reply mail by the vehicle 11, the position mark of the vehicle 12 and the "name of the receiving person" notified in addition to the position mark of the vehicle as well as the "goal" and "arrival time", are displayed overlaid on the map screen (109) (S1401 to S1408).

Upon receipt of mail from the vehicle 11 requesting the present position+destination, the vehicle 12 displays the received content and a reply menu screen (205) including the present position and the destination on the display. In this embodiment, the user of the vehicle 12 selects the "latitude and longitude", "goal" and "arrival time". Then, the reply mail including the information of the receiving end (latitude and longitude of the present position, goal and arrival time) is transmitted to the vehicle 11 of the transmitting side (S2401 to S2407).

Here, though the procedure for setting the goal and the arrival time has not been described in detail, various methods cap be applied as described above, such as inputting the text, inputting the voice or utilizing a screen for selecting desired image data. It will further be obvious that a variety of reply methods can similarly be applied during the automatic reply as described above.

Figure 13:
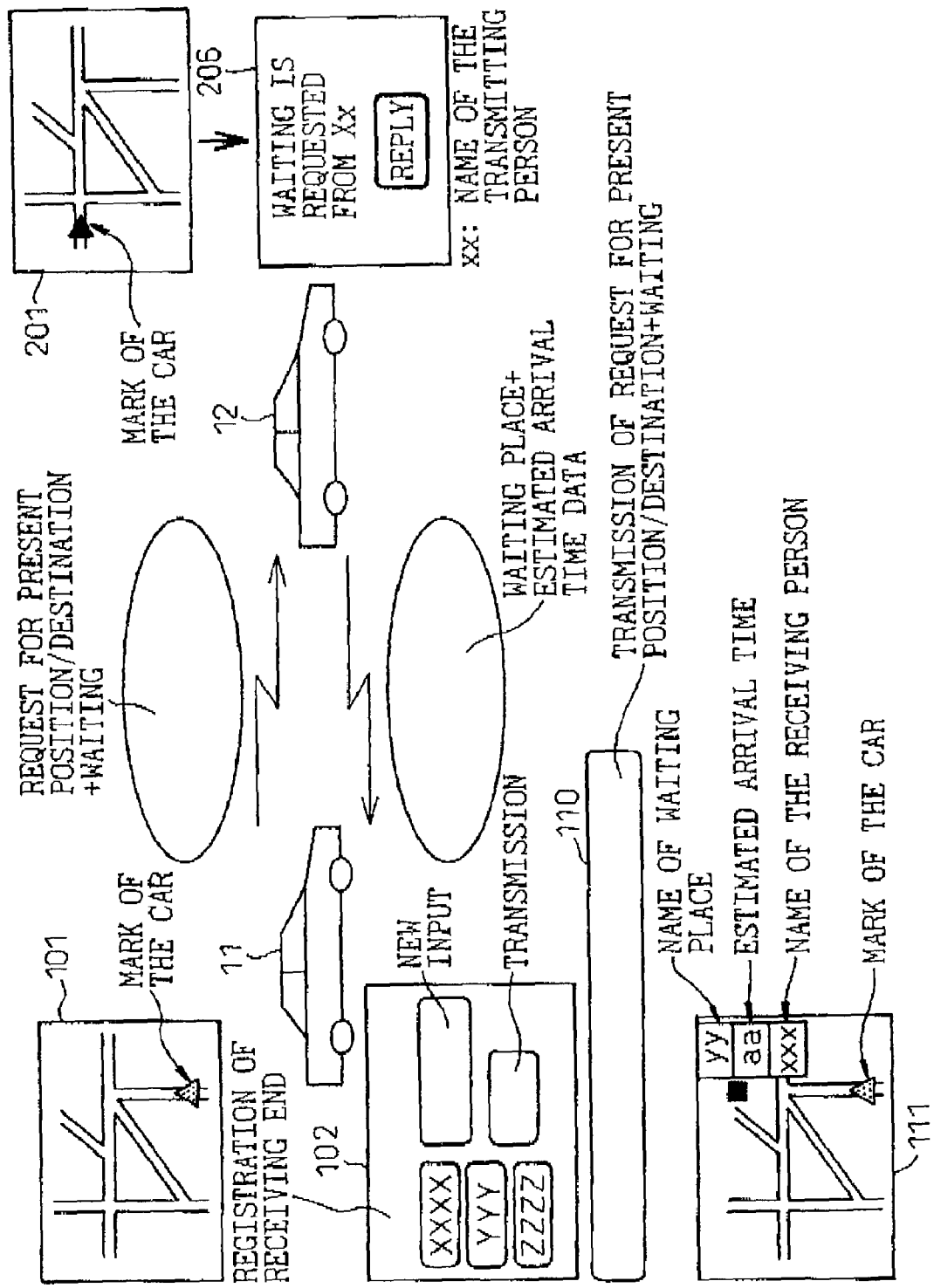
FIG. 13 is a diagram illustrating a fifth embodiment of the present invention.

FIGS. 13, 14A and 14B illustrate a fifth embodiment of the present invention which corresponds to a modified example of the above third embodiment. FIG. 13 schematically illustrates a procedure by which the vehicle 11 of the transmitting side requests a reply from the vehicle 12 of the receiving side concerning the "present position/destination+waiting". FIG. 14A is a flowchart of request control of the vehicle 11, and FIG. 14B is a flowchart of reply control of the vehicle 12.

The user of the vehicle 11, first, depresses a "Present Position/Destination+waiting Request" button 110 on the display to request the reply to the vehicle 12 concerning the present position/destination+waiting. Thereafter, the procedure is the same as that of the third embodiment except that the transmission mail from the vehicle 11 includes the present position and destination data of the transmitting source and that the reply mail from the vehicle 12 includes, "waiting place" data and the "arrival time" data as the information of the receiving end. Upon receipt of the reply mail by the vehicle 11, the "name of the receiving person" of the vehicle 12 who is notified, the "waiting place" and the "arrival time" in addition to the position mark of the car on display, are displayed overlaid on the map screen (109) (S1501 to S1508).

Upon receipt of a mail from the vehicle 11 requesting the present position/destination+waiting, the vehicle 12 displays the received content and a screen (206) including the "Reply" button on the display. In this embodiment, as the user of the vehicle 12 depresses the "Reply" button, the receiving side calculates an optimum waiting place (from the standpoint of time and distance) and an estimated arrival time relying upon the present position of the transmitting source and the information of the destination, and sends back the results by reply mail as information of the receiving end (S2501 to S2506). In this case, too, either the manual reply or the automatic reply can be selected, and various methods described above can be applied to the method of automatic reply.

Figure 16A:
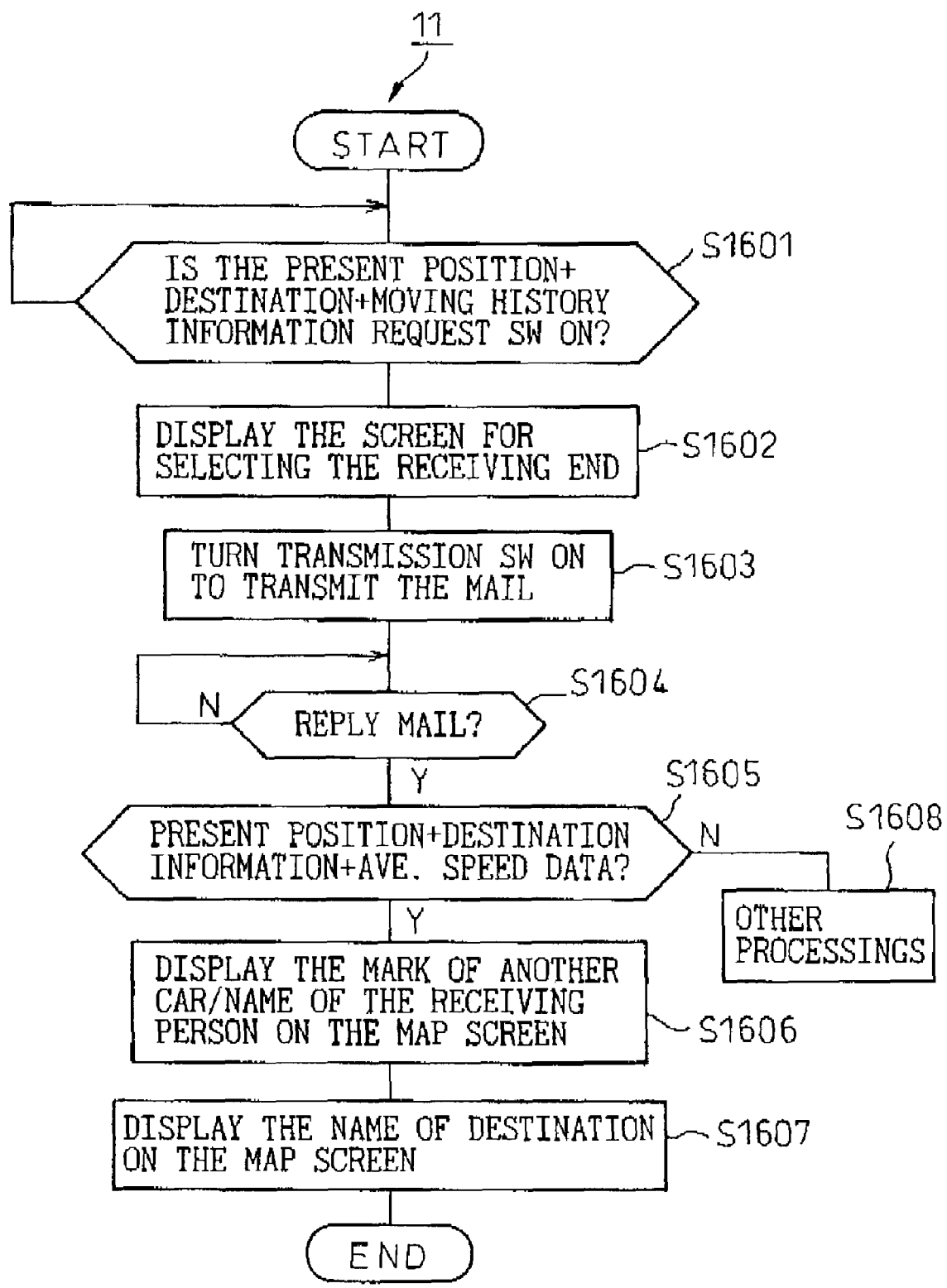
FIG. 16A is a flowchart of request control of FIG. 15.

FIGS. 15, 16A and 16B illustrate a sixth embodiment of the present invention which corresponds to a modified example of the above third embodiment. FIG. 15 schematically illustrates a procedure by which the vehicle 11 of the transmitting side requests a reply from the vehicle 12 of the receiving side concerning the "present position+destination+moving history information". FIG. 16A is a flowchart of request control of the vehicle 11, and FIG. 16B is a flowchart of reply control of the vehicle 12.

The user of the vehicle 11, first, depresses a "Present Position+Destination+Moving History Information Request" button 112 on the display to request the reply to the vehicle 12 concerning the present position+destination+moving history information. Thereafter, the procedure is the same as that of the third embodiment except that the reply mail from the vehicle 12 newly includes the "name of destination" data and the "average speed" data as the information of the receiving end. Upon receipt of the reply mail by the vehicle 11, the "name of the receiving person" of the vehicle 12 that is notified, "name of the destination" and "average speed" in addition to the position mark of the vehicle on display, are displayed overlaid on the map screen (113) (S1601 to S1608).

Upon receipt of a mail from the vehicle 11 requesting the present position+destination+moving history information, the vehicle 12 displays the received content and a screen (207) including the "Reply" button on the display. In this embodiment, as the user of the vehicle 12 depresses the "Reply" button, the receiving side calculates an average speed per a unit time, and sends back the results by reply mail as information of the receiving end ("present position", "destination information" and "average speed") (S2601 to S2606). Here, either the manual reply or the automatic reply can be selected, and various methods described above can be applied to the method of automatic reply.

Figure 18A:
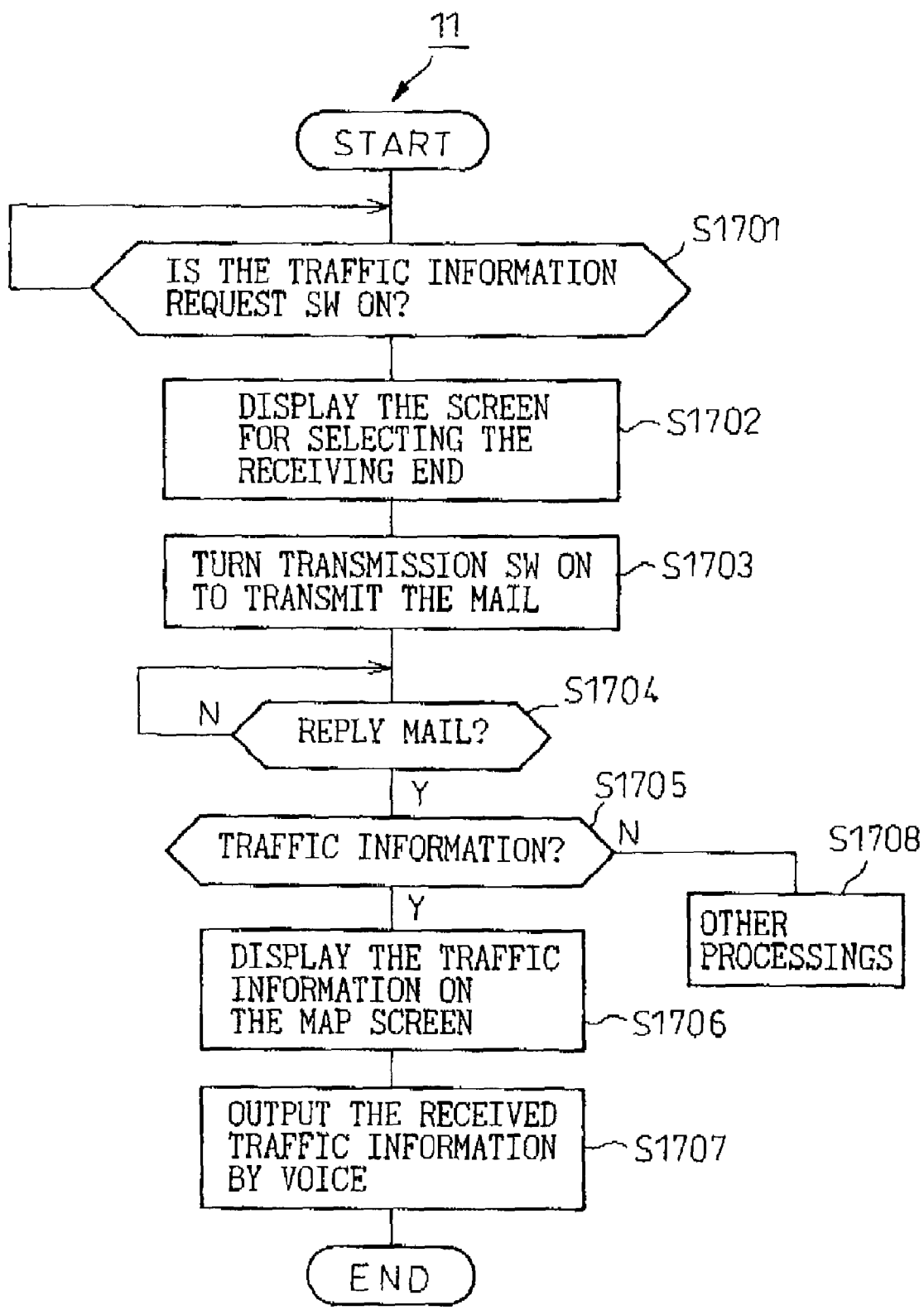
FIG. 18A is a flowchart of request control of rig. 17.
Figure 18B:
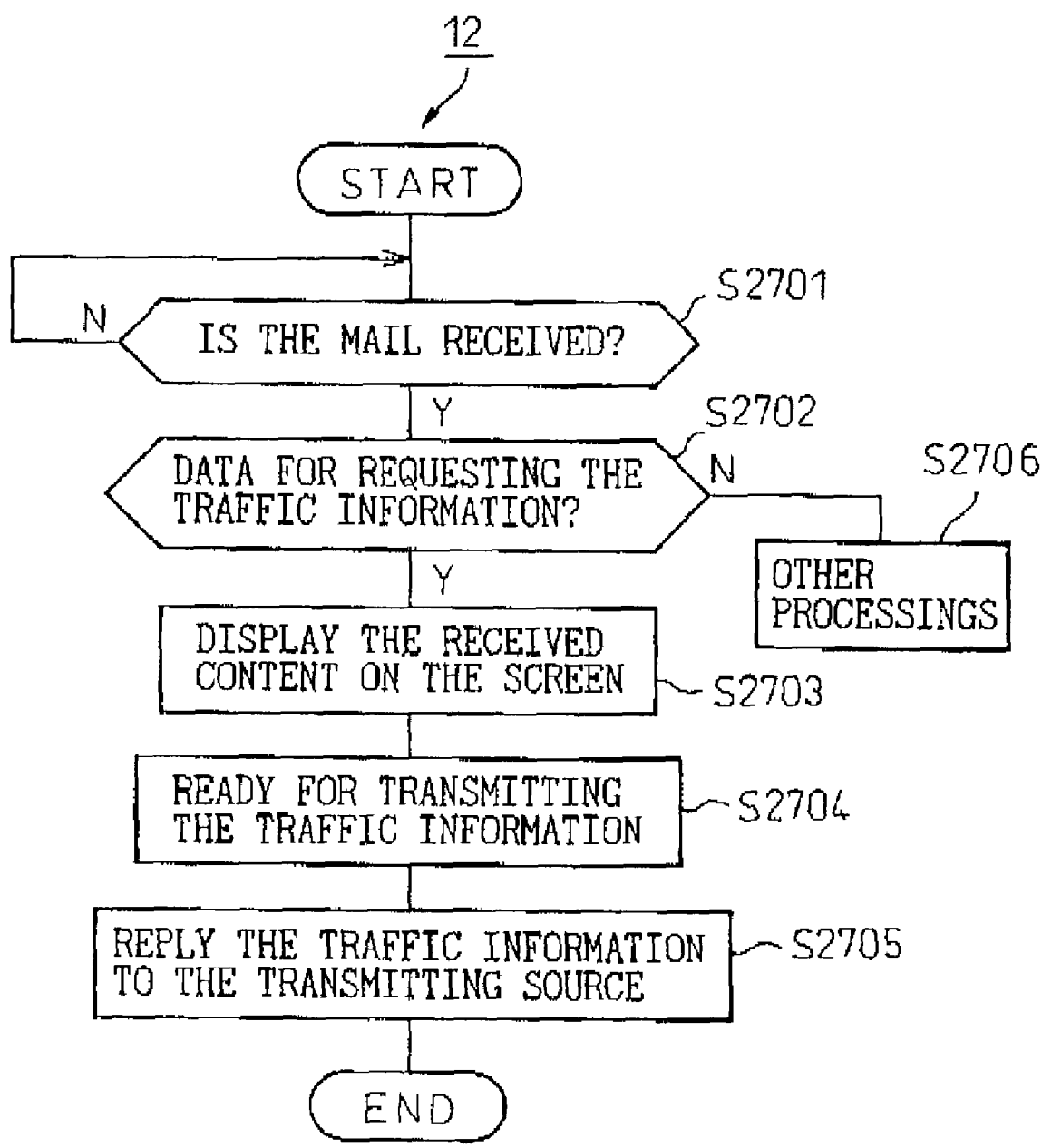
FIG. 18B is a flowchart of reply control of FIG. 17.

FIGS. 17, 18A and 18B illustrate a seventh embodiment of the present invention which corresponds to a modified example of the above third embodiment. FIG. 17 schematically illustrates a procedure by which the vehicle 11 of the transmitting side requests a reply from the vehicle 12 of the receiving side concerning the "traffic information". FIG. 18A is a flowchart of request control of the vehicle 11, and FIG. 18B is a flowchart of reply control of the vehicle 12. This embodiment deals with the procedure of communication according to which the vehicle 11 which is not equipped with a VICS (Vehicle Information and Communication System) receiver obtains the traffic information from the vehicle 12 equipped therewith.

The user of the vehicle 11 depresses a "Traffic Information Request" button 114 on the display to request the reply to the vehicle 12 concerning the traffic information. Thereafter, the procedure is the same as that of the third embodiment except that the reply mail from the vehicle 12 includes the "traffic information" as the information of the receiving end. Upon receipt of the reply mail by the vehicle 11, the traffic information related to VICS notified in addition to the position mark of the vehicle on display, are displayed overlaid on the map screen (115) and, further, the voice data included in the traffic information and, as required, the text data are output by voice (116) (S1701 to S1708).

Upon receipt of mail from the vehicle 11 requesting the traffic information, on the other hand, the vehicle 12 displays the received content and a screen (208) including the "Reply" button on the display. In this embodiment, as the user of the vehicle 12 depresses the "Reply" button, the reply mail to which is attached traffic information related to the VICS is sent back as information of the receiving end (S2701 to S2706). Here, the kind of data (accident, traffic jam, etc.) may be specified in requesting the traffic information. Further, either the manual reply or the automatic reply can be selected, and various methods described above can be applied to the method of automatic reply, such as limiting the time to that of during receiving new traffic information or imposing a limitation upon the time as described earlier.

Figure 20A:
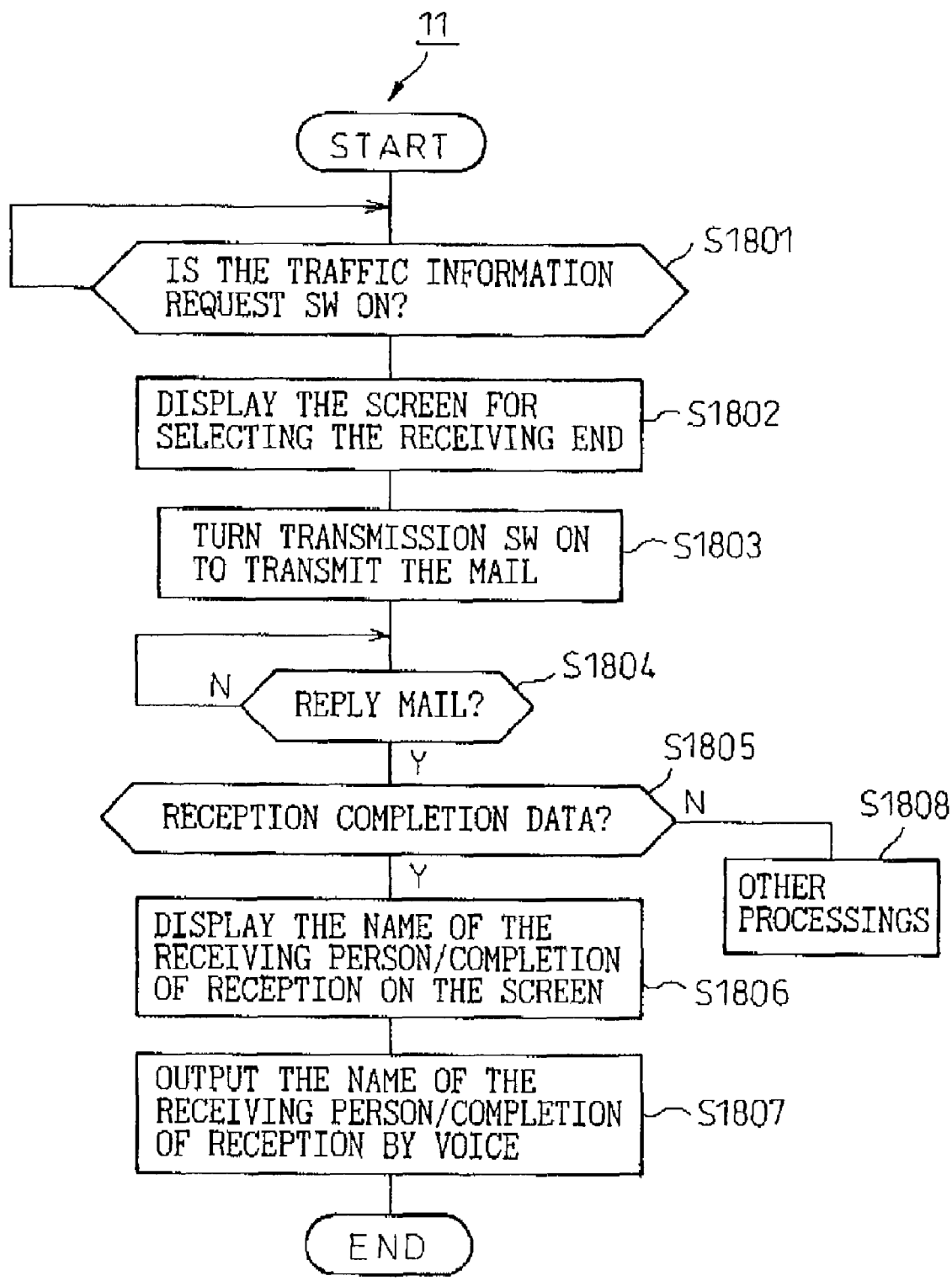
FIG. 20A is a flowchart of request control of FIG. 19.
Figure 20B:
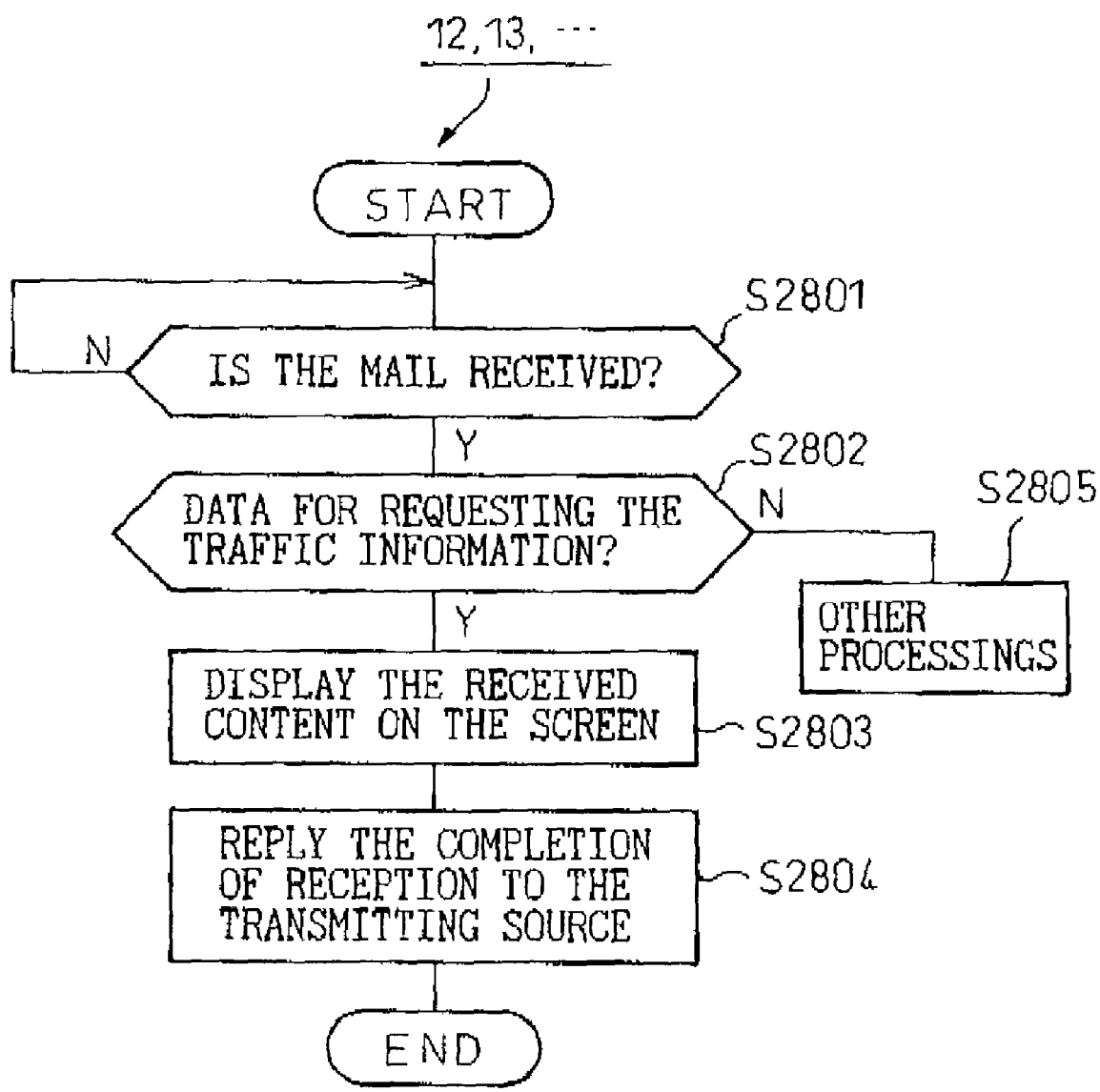
FIG. 20B is a flowchart of reply control of FIG. 19.

FIGS. 19, 20A and 20B illustrate an eighth embodiment of the present invention. FIG. 19 schematically illustrates a procedure for making sure that the "request for traffic information" transmitted from the vehicle 11 of the transmitting side is received by a plurality of vehicles 12, 13, etc., on the receiving side without the problem in the seventh embodiment. FIG. 20A is a flowchart of request control of the vehicle 11, and FIG. 20B is a flowchart of reply control of the vehicles 12, 13, etc.

The user of the vehicle 11 depresses a "Traffic Information Request" button 114 on the display to transmit a request for traffic information to the vehicles 12, 13, etc., and stands by to receive the mail of the completion of reception from the vehicles 12, 13, etc. At the time of reception, a screen 117 showing the "name of the receiving person" and, "reception completed" is displayed on the display for each of the vehicles 12, 13, etc., and, as required, a voice stating this fact is output (116) (S1801 to S1808).

Upon receipt of the mail from the vehicle 11 requesting the traffic information, on the other hand, the vehicle 12 displays a screen (209) showing this fact and the "name of the transmitting person" on the display and, then, automatically sends back the mail of reception completion (S2701 to S2706). Though not illustrated in this embodiment, the subsequent procedure is the same as that of the above-mentioned seventh embodiment. "Traffic information" are sent back to the vehicle 11 from the vehicles 12, 13, etc., and the traffic information that are received are displayed in an overlaid manner on the display of the vehicle 11 (see 115 of FIG. 17).

In the foregoing the present invention was described based on a prerequisite of using electronic mail. The invention, however, is in no way limited to the use of electronic mail only but may utilize, for example FTP (file transfer protocol) or HTTP (hyper text transfer protocol) to realize the same communication function.

According to the present invention as described above, it is allowed to readily grasp the conditions (places, traveling state, margin in the time, etc.) of vehicles during traveling upon exchanging electronic mail. Upon linking this art to the car navigation function, it is possible to realize smooth and comfortable traveling by vehicles. Further, simple end-to-end communication among the vehicles without the communication center, makes it possible to realize communication at low cost requiring the charge of the cellular phones only. So-called freeware (free software) which is reliable can be used as the server software for realizing this communication, and the device can be produced at a low cost.

What is claimed is:

1. A car-mounted information device comprising:
   a cellular phone terminal connected to an external unit;
   a car navigation function;
   a mail transmitting/receiving function for conducting, by using electronic mail, end-to-end data transmission/reception among vehicles through the cellular phone terminal;
   a car navigation-linking function for processing information of the electronic mail transmitted and received by linking the information to a car navigation function;
   wherein information of said electronic mail includes information returned back from the receiving side vehicle in response to a request from the transmitting side vehicle and is related to the vehicle of the receiving end; and
   a reply selection means for selecting either automatic reply or manual reply of information related to the vehicle of the receiving end in response to a request from the vehicle of the transmitting side.

2. A device according to claim 1, wherein the vehicles are connected together by dial-up through cellular phone terminals.

3. A device according to claim 1, wherein information of the electronic mail includes information transmitted from a transmitting side vehicle to a receiving side vehicle and is related to the vehicle of the transmitting source.

4. A device according to claim 3, wherein:
information of said transmitting source includes information of a present position and/or information related thereto;
said car navigation-linking function of the receiving side vehicle displays the present position of the transmitting side vehicle that is received overlaid on the present position of the vehicle of the receiving side; and
said related information is displayed at a predetermined position.

5. A device according to claim 4, wherein said related information is any one of traffic information, destination, waiting or moving history.

6. A device according to claim 5, wherein said related information is any one of text, logo mark, signboard or image data.

7. A device according to claim 6, wherein said related information further includes voice data, and said car navigation-linking function outputs said voice data or predetermined text data by voice.

8. A device according to claim 3, wherein:
information of said receiving end includes information of the present position and/or information related thereto;
said car navigation-linking function displays the present position of the receiving side vehicle that is received overlaid of the present position of the transmitting side vehicle; and
said related information is displayed at a predetermined position.

9. A device according to claim 8, wherein information of said present position is the information of the latitude and longitude of the vehicle of the receiving side.

10. A device according to claim 1, wherein, in selecting the automatic reply, said reply selection means further selects whether the information is instantly replied or replied after predetermined conditions are satisfied.

11. A device according to claim 10, wherein said predetermined conditions include presence of instruction for automatic reply in response to the request from the vehicle of the transmitting side, predetermined date and hour conditions or predetermined geographical conditions.

12. A device according to claim 11, wherein the content of reply is limited to reply items instructed by said instruction for automatic reply.

13. A device according to claim 1, wherein said reply selection means further judges the presence of the user's reply privilege in selecting manual operation.

* * * * *